(12) United States Patent
Chang

(10) Patent No.: US 12,107,492 B2
(45) Date of Patent: Oct. 1, 2024

(54) POWER FACTOR CORRECTION CONVERTER, CONTROLLER AND ZERO CURRENT PREDICTION CIRCUIT THEREOF

(71) Applicant: Richtek Technology Corporation, Zhubei (TW)

(72) Inventor: Wei-Hsu Chang, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 237 days.

(21) Appl. No.: 18/048,066

(22) Filed: Oct. 20, 2022

(65) Prior Publication Data

US 2023/0148139 A1    May 11, 2023

Related U.S. Application Data

(60) Provisional application No. 63/277,030, filed on Nov. 8, 2021.

(30) Foreign Application Priority Data

Jun. 7, 2022   (TW) .................................. 111121083

(51) Int. Cl.
*H02M 1/42*    (2007.01)
*H02M 1/00*    (2007.01)

(52) U.S. Cl.
CPC ....... *H02M 1/4225* (2013.01); *H02M 1/0009* (2021.05); *H02M 1/0058* (2021.05)

(58) Field of Classification Search
CPC . H02M 1/4225; H02M 1/0009; H02M 1/0058
See application file for complete search history.

(56) References Cited

U.S. PATENT DOCUMENTS 10,432,085 B2 * 10/2019 Bhandarkar .......... H02M 7/217
10,491,131 B2 * 11/2019 Bhandarkar ...... H02M 3/33592
2014/0362614 A1 * 12/2014 Koga .................. H02M 1/4225
                                                                363/21.17

* cited by examiner

*Primary Examiner* — Jue Zhang
(74) *Attorney, Agent, or Firm* — Tung & Associates

(57) ABSTRACT

A power factor correction converter includes a power stage circuit, a current sensing circuit and a zero current prediction circuit. The power stage circuit converts a rectified power to an output power. The power stage circuit operates in a boundary conduction mode to correct a power factor of the rectified power. The current sensing circuit senses an inductor current to generate a sensing signal. The zero current prediction circuit controls at least one switch by: generating a second period according to a first period, wherein the first period is between when the sensing signal passes a first threshold and when the sensing signal passes a second threshold; and switching a state of the at least one switch at an end time point of the second period, wherein the end time point corresponds to a zero current time point at which the inductor current reaches zero.

28 Claims, 16 Drawing Sheets

POWER FACTOR CORRECTION CONVERTER, CONTROLLER AND ZERO CURRENT PREDICTION CIRCUIT THEREOF

CROSS REFERENCE

The present invention claims priority to U.S. 63/277,030 filed on Nov. 8, 2021 and claims priority to TW 111121083 filed on Jun. 7, 2022.

BACKGROUND OF THE INVENTION

Field of Invention

The present invention relates to a converter; particularly, it relates to a power factor correction converter. The present invention also relates to a power factor correction controller and a zero current prediction circuit for use in the power factor correction converter.

Description of Related Art

Please refer to FIG. 1, which shows a schematic circuit diagram of a conventional power factor correction converter 100. As shown in FIG. 1, a typical power factor correction converter is a boost switching converter which operates in a boundary conduction mode (BCM), wherein such boost switching converter converts a rectified power to an output power, thereby enhancing a power factor of a power system. The rectified power has a rectified voltage Vi, whereas, the output power has an output voltage Vo.

Please refer to FIG. 1 in conjugation with FIG. 2A and FIG. 2B. FIG. 2A and FIG. 2B are signal waveform diagrams depicting a situation where the conventional power factor correction converter of FIG. 1 operates in the boundary conduction mode (BCM) wherein the constant ON period ton is employed. In FIG. 2A, the waveform W1 indicates the current $I_L$ flowing through the inductor L. When the current $I_L$ flowing through the inductor L is decreased to zero, the control signal G1 will transit from low level to high level, whereby the transistor Q1 of the power factor correction converter 100 is controlled to be ON for the constant ON period ton. Through periodical switching, an average current of the current $I_L$ flowing through the inductor L is regulated to be the average current $I_{L,\ avg}$, and such average current $I_{L,\ avg}$ is in-phase with the rectified voltage Vi, whereby the power factor of an alternating current (AC) input power is enhanced, wherein the AC input power has an AC input voltage Vac.

As shown in FIG. 2B, the waveform W2 indicates the current $I_D$ flowing through the diode D5, whereas, the waveform W2' (which is illustrated by a dashed line) indicates the current I1 flowing through the transistor Q1. When the transistor Q1 is ON, the current $I_L$ will flow through the transistor Q1 and will not flow through the diode D5. In this case, the current $I_D$ is zero and the current I1 is the current $I_L$. When the transistor Q1 is OFF, the current $I_L$ will flow through the diode D5 and will not flow through the transistor Q1. In this case, the current $I_D$ is the current $I_L$ and the current I1 is zero.

In order to achieve BCM, it is required for a power factor correction converter to use a zero current sensing circuit. As shown in FIG. 1, the conventional power factor correction converter 100 comprises a zero current sensing circuit 101, which serves to sense a time point when the current $I_L$ flowing through the inductor L becomes zero (referred as a "zero current time point" of the inductor L hereinafter).

The conventional zero current sensing circuit 101 generates a constant delay period according to a constant threshold, so as to sense a zero current time point of the inductor L. Nevertheless, such sensing approach is not accurate. Please refer to FIG. 3, which illustrates a signal waveform diagram depicting different current waveforms of a current flows through an inductor when the conventional power factor correction converter of FIG. 1A operates at different rectified voltages. The waveform W3 and the waveform W4 (which is illustrated as a dot-dashed line) indicate different situations of a current $I_L$ flowing through an inductor L at different rectified voltages Vi. Because the rectified voltage Vi changes as the time changes, the slope of the current $I_L$ changes as the time changes. In this case, when detecting zero current according to a constant threshold, the required delay period will be different. As exemplified by FIG. 3, when the constant threshold is 4 millivolt (mV), it takes a delay period Td1 for the current level of the inductor L in the waveform W3 to drop from 4 millivolt (mV) to zero, whereas, it takes a delay period Td2 for the current level of the inductor L in the waveform W4 to drop from 4 millivolt (mV) to zero, wherein the length of the delay period Td1 is shorter than the length of the delay period Td2. Hence, if the conventional zero current sensing circuit 101 senses a zero current time point of the inductor L by only adopting a constant threshold and a constant delay period, an error is likely to occur, causing the conventional power factor correction converter 100 to receive an incorrect zero current time point of the inductor L, such that the conventional power factor correction converter 100 will be unable to stably operate in BCM.

In view of the above, to overcome the drawback in the prior art, the present invention proposes a power factor correction controller and a zero current prediction circuit for use in the power factor correction converter, so that the power factor correction converter of the present invention can precisely sense a zero current time point of an inductor, whereby the power factor correction converter of the present invention will be able to stably operate in BCM.

SUMMARY OF THE INVENTION

From one perspective, the present invention provides a power factor correction converter, comprising: a power stage circuit including at least one switch, wherein the power stage circuit is configured to operably switch a coupling relationship between an inductor and a rectified power and a coupling relationship between the inductor and an output power, so as to convert the rectified power to the output power, wherein the power stage circuit is configured to operate in a boundary conduction mode (BCM) to correct a power factor of the rectified power; a current sensing circuit, which is configured to operably sense a current flowing through the inductor, so as to generate a current sensing signal; and a zero current prediction circuit, which is configured to operably control the at least one switch; wherein the zero current prediction circuit is configured to operably control the at least one switch by steps including: generating a second period according to a first period, wherein the first period is a time period between when the current sensing signal passes a first threshold and when the current sensing signal passes a second threshold; and switching a state of the at least one switch at an end time point of the second period, wherein the end time point of the second period corresponds to a zero current time point at which the current flowing through the inductor reaches zero.

From another perspective, the present invention provides a power factor correction controller for use in a power factor correction converter, comprising: a zero current prediction circuit, which is configured to operably control at least one switch of a power stage circuit, so as to switch a coupling relationship between an inductor and a rectified power and a coupling relationship between the inductor and an output power, thus converting the rectified power to the output power, wherein the power stage circuit is configured to operate in a boundary conduction mode (BCM) to correct a power factor of the rectified power; wherein the zero current prediction circuit is configured to operably control the at least one switch by steps including: generating a second period according to a first period, wherein the first period is a time period between when the current sensing signal passes a first threshold and when the current sensing signal passes a second threshold; and switching a state of the at least one switch at an end time point of the second period, wherein the end time point of the second period corresponds to a zero current time point at which the current flowing through the inductor reaches zero; an error amplifier, which is configured to operably generate an error amplification signal according to a difference between a reference voltage and the feedback voltage; and a pulse width modulation (PWM) circuit, which is configured to operably generate a control signal according to the error amplification signal and a signal related to the zero current time point, wherein the control signal is configured to operably control the switching of the at least one switch.

In one embodiment, the power factor correction converter further comprises: a feedback circuit, which is configured to operably generate a feedback voltage according to the output power; an error amplifier, which is configured to operably generate an error amplification signal according to a difference between a reference voltage and the feedback voltage; and a pulse width modulation (PWM) circuit, which is configured to operably generate a control signal according to the error amplification signal and a signal related to the zero current time point, wherein the control signal is configured to operably control the at least one switch.

In one embodiment, a length of the first period is equal to a length of the second period.

In one embodiment, an absolute value of a difference between the first threshold and the second threshold is smaller than a peak-to-peak value of the current sensing signal.

In one embodiment, an absolute value of a difference between the first threshold and the second threshold is smaller than ½-fold of a peak-to-peak value of the current sensing signal.

In one embodiment, the zero current prediction circuit includes: a first comparator and a second comparator; wherein the first comparator is configured to operably generate a first comparison signal according to a level of the current sensing signal and the first threshold; wherein the second comparator is configured to operably generate a second comparison signal according to the level of the current sensing signal and the second threshold; wherein the zero current prediction circuit is configured to operably generate the first period according to the first comparison signal and the second comparison signal.

In one embodiment, the zero current prediction circuit further includes: a timer circuit, which is configured to operably timing the first period between when the level of the current sensing signal passes the first period and when the level of the current sensing signal passes the second threshold according to the first comparison signal and the second comparison signal, so as to generate a timing signal, and the timer circuit is further configured to operably timing the second period according to the timing signal, wherein the second period has a period ratio to the first period.

In one embodiment, the timer circuit includes: at least one integration capacitor and at least one current source; wherein the zero current prediction circuit is configured to operably control the at least one switch by steps including: when the level of the current sensing signal passes the second threshold at a first time point, the at least one current source starts charging the at least one integration capacitor to perform a first integration from an initial potential; when the level of the current sensing signal passes the first threshold at a second time point, the at least one current source stops executing the first integration on the at least one integration capacitor, wherein the at least one integration capacitor generates a first integration voltage at the second time point; starting from the second time point, the at least one current source starts charging the at least one integration capacitor to perform a second integration, wherein a time span between the first time point and the second time point is the first threshold; and during the second integration, determining a third time point according to a voltage of the at least one integration capacitor and the first integration voltage, wherein a time span between the second time point and the third time point is the second threshold, and wherein the third time point corresponds to the zero current time point.

In one embodiment, an absolute value of a difference between the first threshold and the second threshold is equal to an absolute value of a difference between the first threshold and the level of the current sensing signal at the third time point.

In one embodiment, the at least one integration capacitor includes: a first integration capacitor and a second integration capacitor; the at least one current source includes: a first current source and a second current source; the timer circuit further includes: a third comparator, which is configured to operably compare the first integration voltage with a voltage of the second integration capacitor, to generate a third comparison signal; wherein the zero current prediction circuit is configured to operably control the at least one switch by steps including: at the first time point, resetting a voltage of the first integration capacitor to the initial potential, and the first current source starting charging the first integration capacitor to perform the first integration from the initial potential; at the second time point, the first current source stopping executing the first integration on the first integration capacitor, so that the first integration capacitor generates the first integration voltage, and at the second time point, resetting a voltage of the second integration capacitor to the initial potential, and the second current source starting charging the second integration capacitor from the initial potential to perform the second integration; and during the second integration period, determining a time point at which the voltage of the second integration capacitor reaches the first integration voltage as the third time point; wherein the period ratio of the first period to the second period is related to a current source ratio of the first current source to the second current source and a capacitance ratio of a capacitance of the first integration capacitor to a capacitance of the second integration capacitor.

In one embodiment, the timer circuit further includes: a sample-and-hold circuit, which is configured to operably sample-and-hold the first integration voltage, to generate a sample-and-hold voltage; and a third comparator, which is configured to operably compare the sample-and-hold voltage with a voltage of the at least one integration capacitor, to generate a third comparison signal; wherein the zero current prediction circuit is configured to operably control the at least one switch by steps including: at the first time point, resetting a voltage of the at least one integration capacitor to the initial potential, and the at least one current source starting charging the at least one integration capacitor to perform the first integration from the initial potential; at the second time point, the at least one current source stopping executing the first integration on the at least one integration capacitor, so that the first integration capacitor generates the first integration voltage, and at the second time point, the sample-and-hold circuit sampling-and-holding the first integration voltage, to generate the sample-and-hold voltage; the voltage of the at least one integration capacitor being reset to the initial potential, and the at least one current source starting charging the at least one integration capacitor to perform the second integration from the initial potential; during the second integration, when the third comparison signal indicates a time point at which the voltage of the at least one integration capacitor reaches the sample-and-hold voltage, determining such time point indicated by the third comparison signal as the third time point.

In one embodiment, the at least one current source includes: a first current source and a second current source, wherein the timer circuit further includes: a third comparator, which is configured to operably compare a voltage of the at least one integration capacitor with a predetermined potential, to generate a third comparison signal; wherein the zero current prediction circuit is configured to operably control the at least one switch by steps including: at the first time point, resetting a voltage of the at least one integration capacitor to the initial potential, and the first current source starting charging the at least one integration capacitor to perform the first integration from the initial potential; at the second time point, the first current source stopping executing the first integration on the at least one integration capacitor, so that the first integration capacitor generates the first integration voltage; and resetting the voltage of the at least one integration capacitor to the initial potential, and the second current source starting charging the at least one integration capacitor to perform the second integration from the initial potential; and during the second integration, when the third comparison signal indicates a time point at which the voltage of the at least one integration capacitor reaches the predetermined potential, determining such time point indicated by the third comparison signal as the third time point; wherein the period ratio of the first period to the second period is related to a current source ratio of the first current source to the second current source.

From yet another perspective, the present invention provides a control method of a power factor correction converter, comprising: controlling at least one switch, so as to switch a coupling relationship between an inductor and a rectified power and a coupling relationship between the inductor and an output power, to thereby convert the rectified power to the output power, wherein the inductor is configured to operate in a boundary conduction mode (BCM) to correct a power factor of the rectified power; sensing a current flowing through the inductor, so as to generate a current sensing signal; generating a second period according to a first period, wherein the first period is a time period between when the current sensing signal passes a first threshold and when the current sensing signal passes a second threshold, and wherein a length of the second period is related to a length of the first period; and switching a state of the at least one switch at an end time point of the second period; wherein the end time point of the second period corresponds to a zero current time point at which the current flowing through the inductor reaches zero.

In one embodiment, the step of generating the second period includes: when the level of the current sensing signal passes the second threshold at a first time point, starting timing the first period; when the level of the current sensing signal passes the first threshold at a second time point, ending timing the first period; and starting from the second time point, generating and starting the second period according to the length of the first period.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies. For the sake of precise elaboration, numerous practical implementation details will be better understood with regard to the detailed elaboration of the embodiments below. It should be understood that the elaboration is not for limiting the broadest scope of the present invention.

Figure 1:
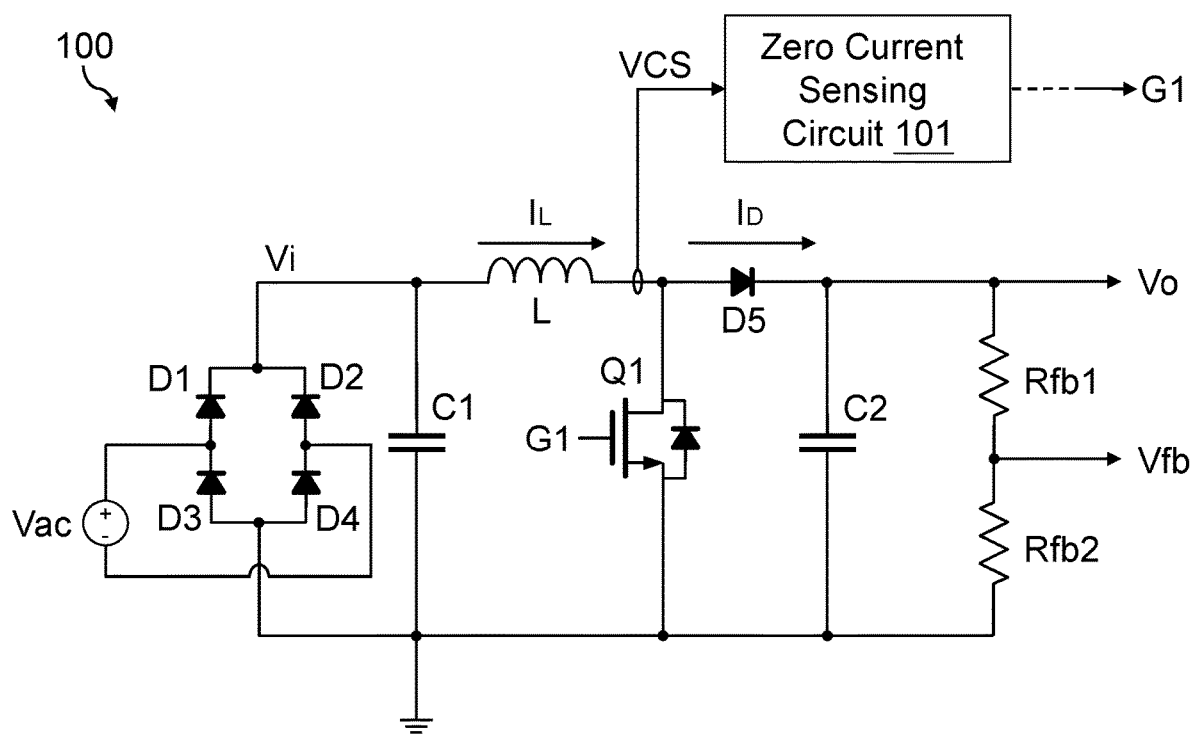
FIG. 1 shows a schematic circuit diagram of a conventional power factor correction converter.
Figure 2A:
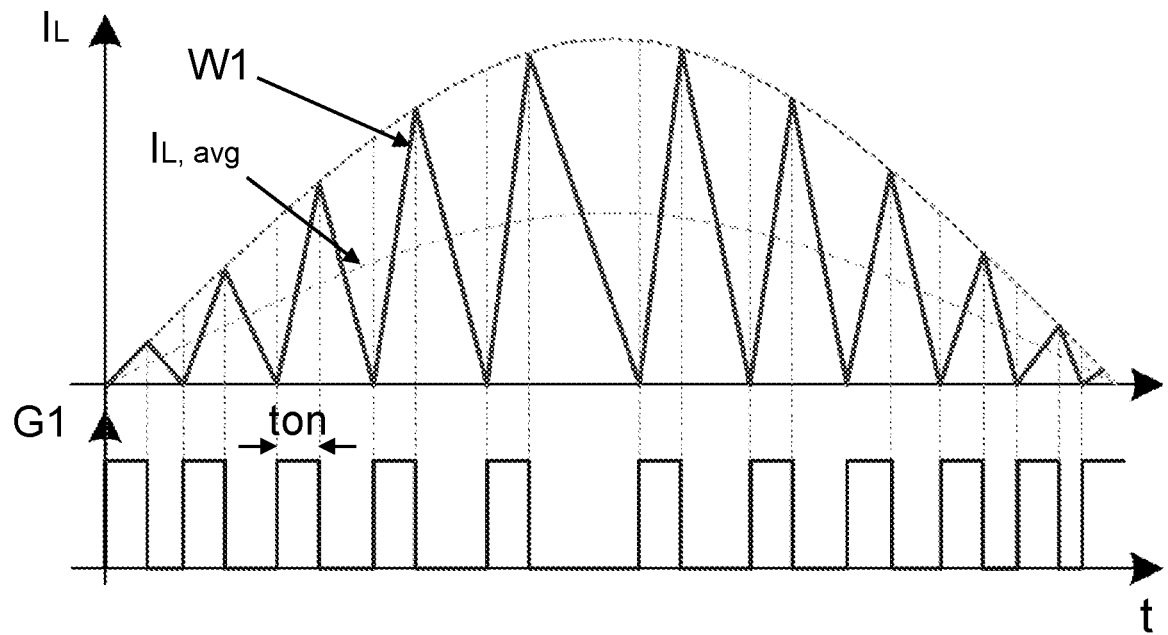
FIG. 2A illustrates a signal waveform diagram (1) depicting a situation wherein the conventional power factor correction converter of FIG. 1A operates in a boundary conduction mode (BCM).
Figure 2B:
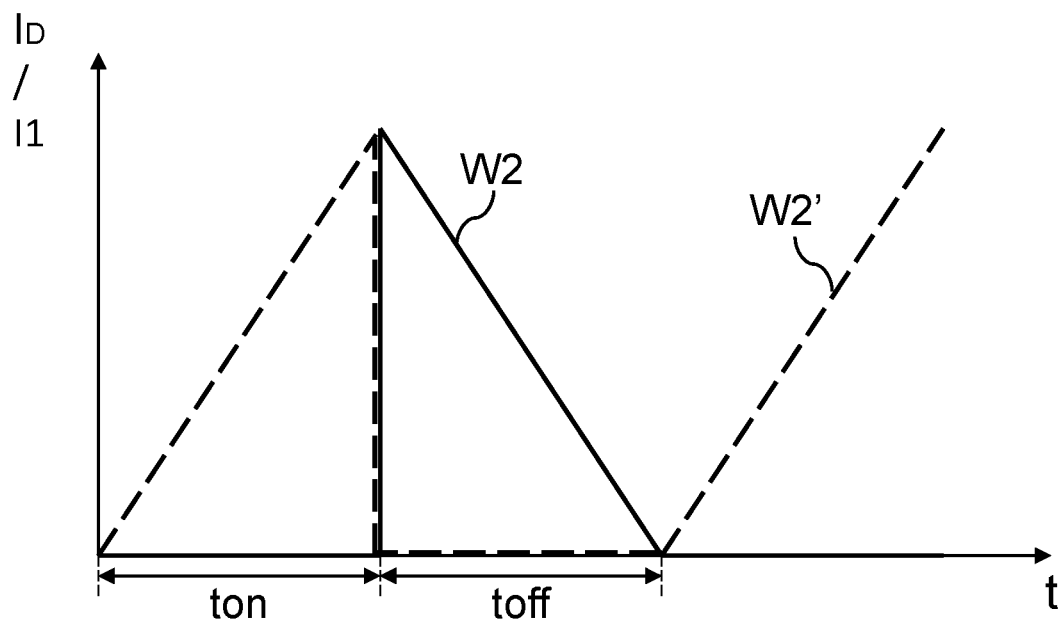
FIG. 2B illustrates a signal waveform diagram (2) depicting a situation wherein the conventional power factor correction converter of FIG. 1A operates in a boundary conduction mode (BCM).
Figure 3:
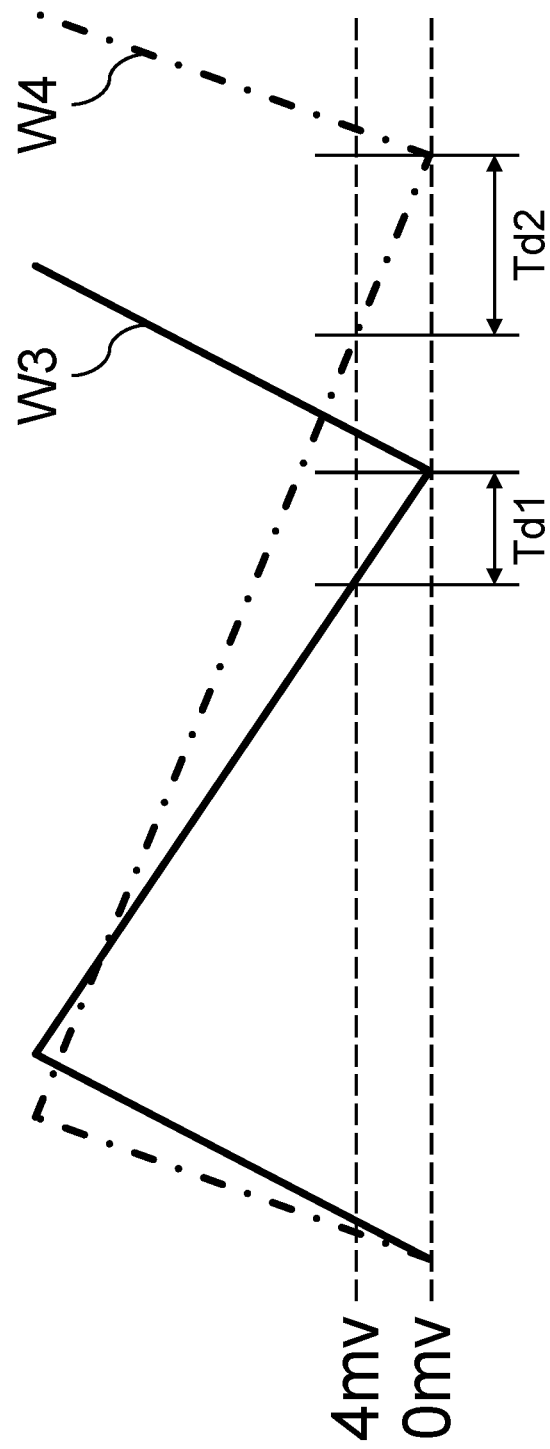
FIG. 3 illustrates a signal waveform diagram depicting different current waveforms of a current flows through an inductor when the conventional power factor correction converter of FIG. 1A operates at different rectified voltages.
Figure 4A:
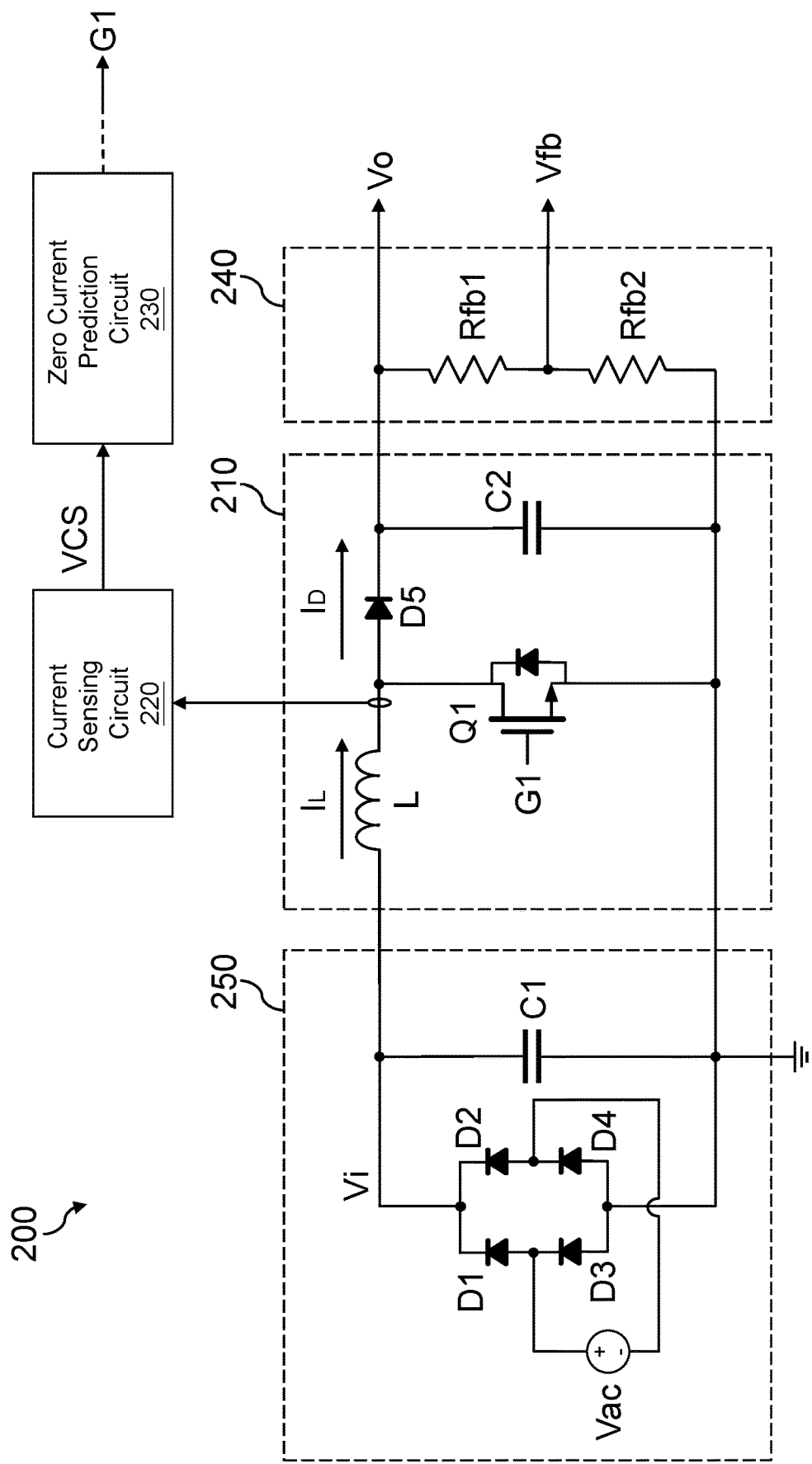
FIG. 4A shows a schematic circuit diagram of a power factor correction converter according to an embodiment of the present invention.

Please refer to FIG. 4A, which shows a schematic circuit diagram of a power factor correction converter 200 according to an embodiment of the present invention. As shown in FIG. 4A, the power factor correction converter 200 comprises: a power stage circuit 210, a current sensing circuit 220, a zero current prediction circuit 230, a feedback circuit 240 and a rectifier 250. The power stage circuit 210 is coupled to the current sensing circuit 220 and the current sensing circuit 220 is coupled to the zero current prediction circuit 230. The power stage circuit 210 includes: a switch Q1, an inductor L, a diode D5 and a capacitor C2. In this embodiment, the power stage circuit 210 can be for example a boost power stage circuit as shown in FIG. 4A, wherein the power stage circuit 210 is configured to operably switch a coupling relationship between the inductor L and a rectified power (which has a rectified voltage Vi) and a coupling relationship between the inductor L and an output power (which has an output voltage Vo), to convert the rectified power to the output power. In this embodiment, the power stage circuit 210 is configured to operate in a boundary conduction mode (BCM) to correct a power factor (PF) of the rectified power (which has a rectified voltage Vi). The current sensing circuit 220 is configured to operably sense a current $I_L$ flowing through the inductor L, so as to generate a current sensing signal VCS. The zero current prediction circuit 230 is configured to operably generate a control signal G1 for controlling the switch Q1. The zero current prediction circuit 230 is configured to operably control the switch Q1 by steps including:

1. generating a second period according to a first period, wherein the first period is a time period between when the current sensing signal VCS passes a first threshold and when the current sensing signal VCS passes a second threshold; and
2. switching a state of the switch Q1 at an end time point of the second period, wherein the end time point of the second period corresponds to a zero current time point at which a level of the current $I_L$ flowing through the inductor reaches zero.

Figure 4B:
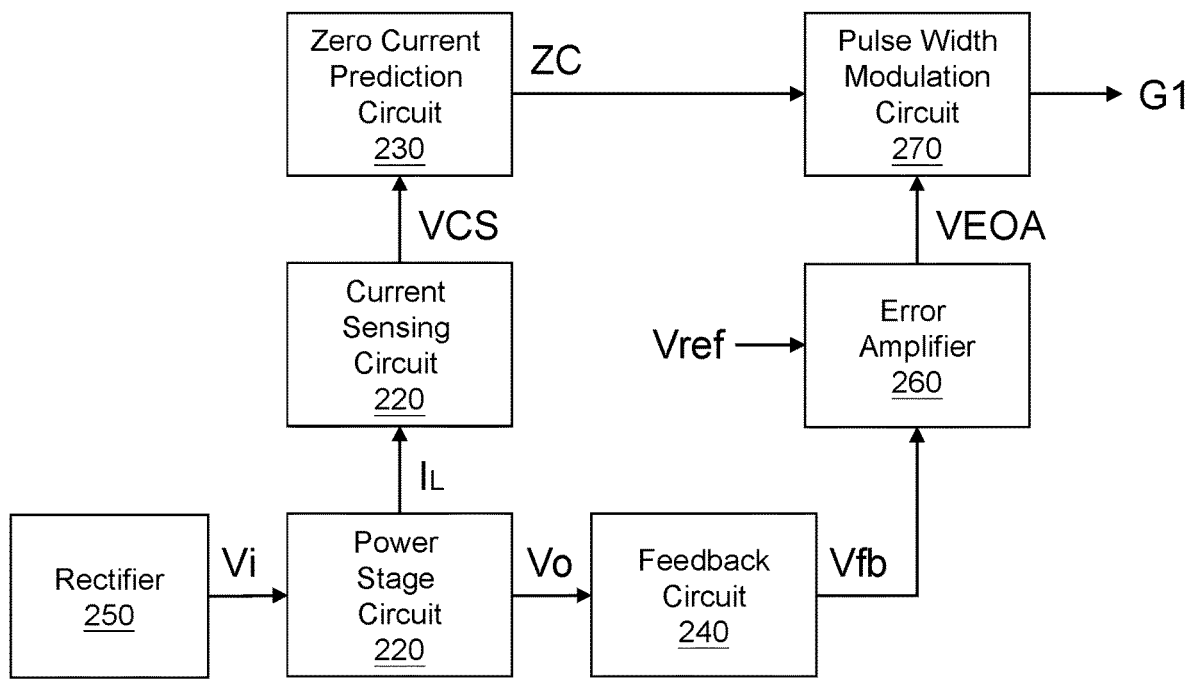
FIG. 4B shows a schematic block module diagram of a power factor correction converter according to an embodiment of the present invention.

Please refer to FIG. 4B, which shows a schematic block module diagram of a power factor correction converter 200 according to an embodiment of the present invention. As shown in FIG. 4B, in one embodiment, the power factor correction converter 200 comprises: a power stage circuit 210, a current sensing circuit 220, a zero current prediction circuit 230, a feedback circuit 240, a rectifier 250, an error amplifier 260 and a pulse width modulation (PWM) circuit 270. The feedback circuit 240 is coupled to the power stage circuit 210. The rectifier 250 is coupled to the power stage circuit 210. The error amplifier 260 is coupled to the feedback circuit 240. The PWM circuit 270 is coupled to the zero current prediction circuit 230 and the error amplifier 260. The configurations and functions of the power stage circuit 210, the current sensing circuit 220, the zero current prediction circuit 230, the feedback circuit 240, the rectifier 250, the error amplifier 260 and the PWM circuit 270 and how they cooperate with one another will be explained below.

In one embodiment, the power stage circuit 210 includes at least one switch, wherein the at least one switch can be a bipolar junction transistor (BJT) or a metal oxide field effect transistor (MOSFET). As shown in FIG. 4A, the power stage circuit 210 can be for example a boost power stage circuit, which includes: an inductor L, a diode D5, a transistor Q1, and a capacitor C2. In one embodiment, the power stage circuit 210 is configured to operably switch a coupling relationship between the inductor L and a rectified power and a coupling relationship between the inductor L and an output power, to convert the rectified power to the output power. The operation of the power stage circuit 210 is controlled by the control signal G1. In an application of the present invention, the level of the output voltage Vo is higher than the level of the rectified voltage Vi. When the control signal G1 is at high level, the transistor Q1 is controlled to be ON, whereas, the diode D5 is non-conductive. In this case, the voltage across the inductor L is a positive voltage, so that the current $I_L$ flowing through the inductor L is increased. When the control signal G1 is at low level, the transistor Q1 is controlled to be OFF, whereas, the diode D5 is conductive. In this case, the voltage across the inductor L is a negative voltage, so that the current $I_L$ flowing through the inductor L is decreased, but the level of the current $I_L$ is still positive, so the current $I_L$ keeps charging the capacitor C2 to generate the output power, whereby the level of the output voltage Vo is higher than the level of the rectified voltage Vi.

Figure 5A:
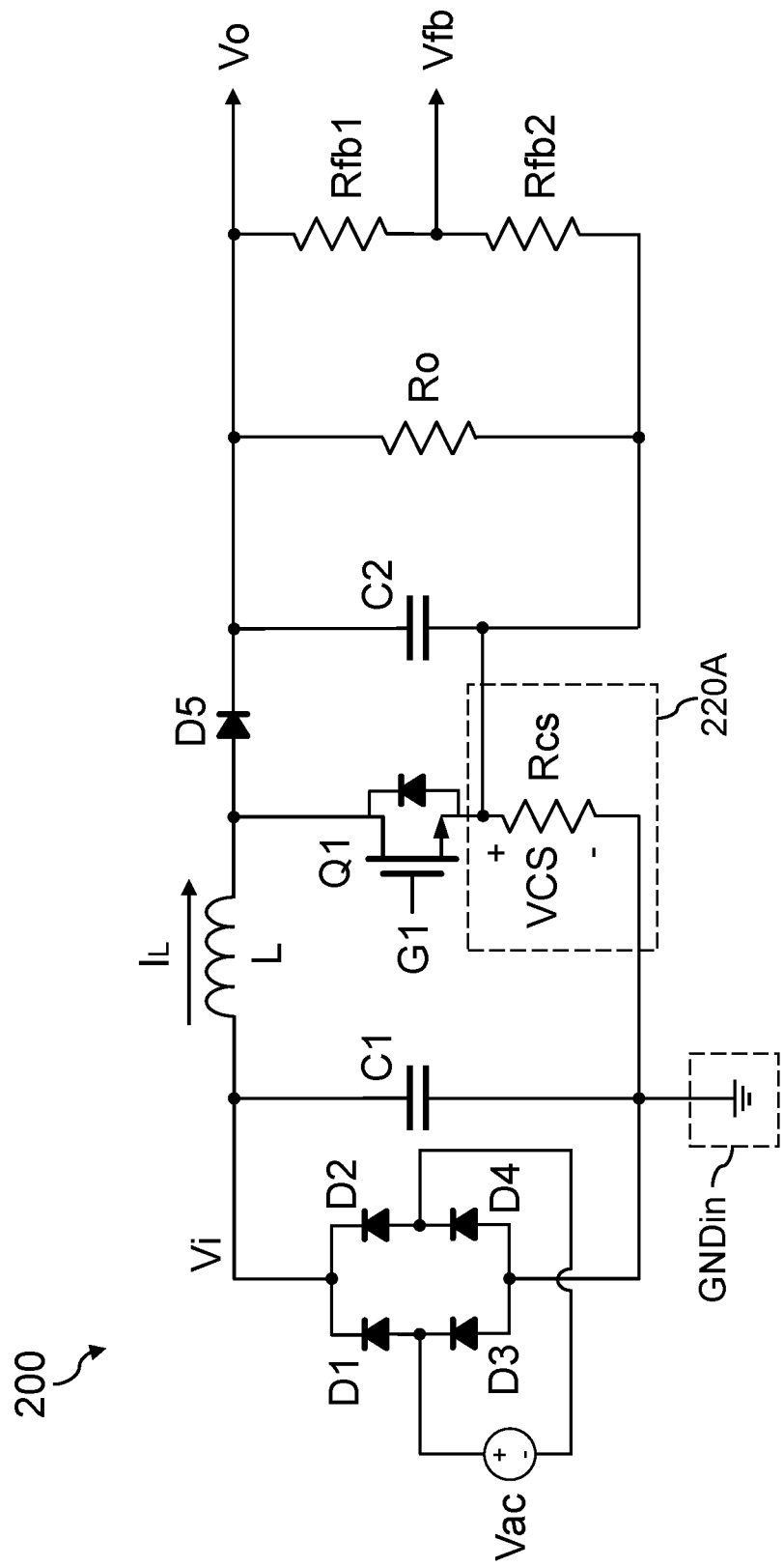
FIG. 5A shows a schematic circuit diagram of a current sensing circuit according to an embodiment of the present invention.
Figure 5B:
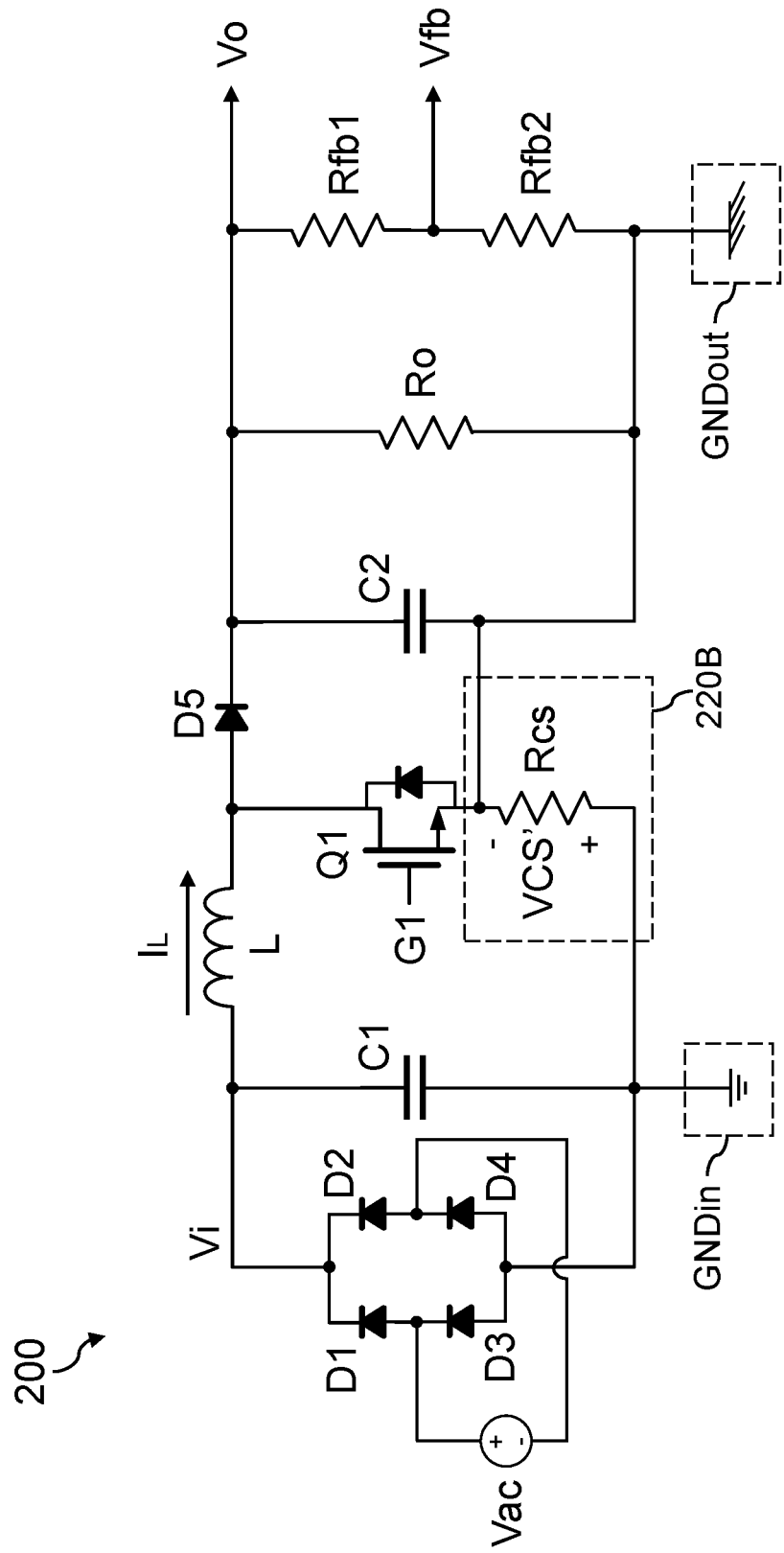
FIG. 5B shows a schematic circuit diagram of a current sensing circuit according to another embodiment of the present invention.
Figure 5C:
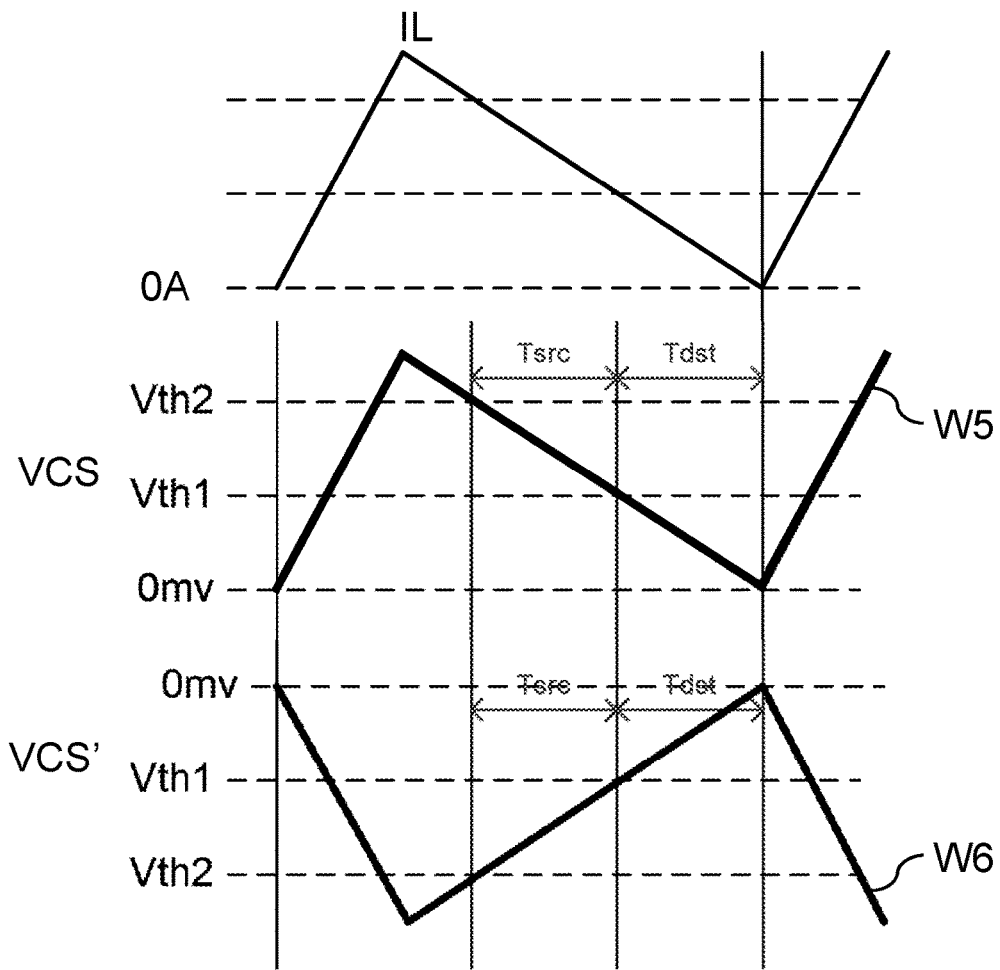
FIG. 5C is a signal waveform diagrams illustrating current sensing signals corresponding to a current of an inductor according to different embodiments of the present invention.

In one embodiment, the current sensing circuit 220 is configured to operably sense the current $I_L$ flowing through the inductor L, so as to generate a current sensing signal VCS. Please refer to FIG. 5A in conjugation with FIG. 5B and FIG. 5C. According to different embodiments of the power factor correction converter 200, FIG. 5A and FIG. 5B include different current sensing circuits 220. That is, FIG. 5A shows a schematic circuit diagram of a current sensing circuit 220A included by the power factor correction converter 200 according to an embodiment of the present invention, whereas, FIG. 5B shows a schematic circuit diagram of a current sensing circuit 220B included by the power factor correction converter 200 according to another embodiment of the present invention. In the embodiment of FIG. 5A and the embodiment of FIG. 5B, the current sensing circuit 220A and the current sensing circuit 220B each includes a current sensing resistor Rcs. The current sensing resistor Rcs has one end coupled to the transistor Q1 and another end coupled to a ground potential GNDin at an input side. FIG. 5C is a signal waveform diagram illustrating a current sensing signal VCS (corresponding to the embodiments of FIG. 5A) and a current sensing signal VCS' (corresponding to the embodiments of FIG. 5B) in correspondence with the current $I_L$ flowing through an inductor L. Referring to the waveform W5 in FIG. 5C which corresponds to FIG. 5A, in the embodiment of FIG. 5A, the reference ground potential of the power factor correction converter 200 is the ground potential GNDin at the input side; because one end of the current sensing resistor Rcs is sensed and because reference ground potential of the current sensing resistor Rcs is the ground potential GNDin at the input side, the current sensing signal VCS is in-phase with the current $I_L$ flowing through the inductor L. On the other hand, referring to the waveform W6 in FIG. 5C which corresponds to FIG. 5B, in the embodiment of FIG. 5B, the reference ground potential of the power factor correction converter 200 is the ground potential GNDout at the output side; because one end of the current sensing resistor Rcs is sensed and because reference ground potential of the current sensing resistor Rcs is the ground potential GNDout at the output side, the current sensing signal VCS' is in reversed phase to the current $I_L$ flowing through the inductor L.

In one embodiment, the zero current prediction circuit 230 is configured to precisely predict a zero current time point according to the current $I_L$ flowing through the inductor L by replicating periods, so as to control the at least one switch of the power stage circuit 210. Taking the power factor correction converter 200 in FIG. 4A as an example, wherein the power stage circuit 210 includes a boost power stage circuit, when the switch Q1 is switched from ON to OFF, the current $I_L$ flowing through the inductor L is decreased linearly. The zero current prediction circuit 230 is configured to operably estimate a decreasing speed of the current $I_L$ according to two current levels at two time points while the current $I_L$ is decreased, so as to determine a time point at which the current $I_L$ is decreased to zero.

Figure 6:
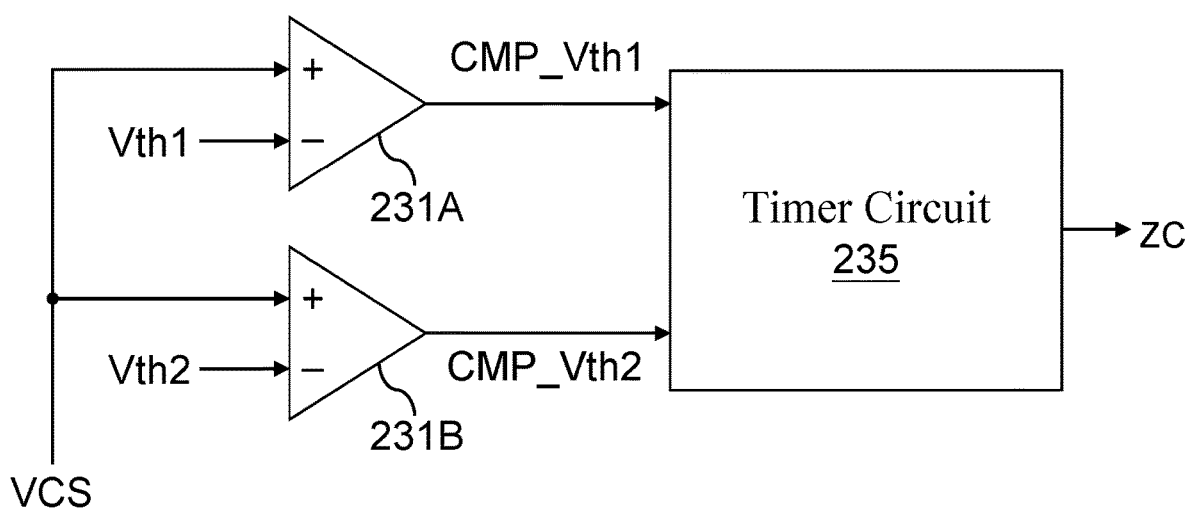
FIG. 6 shows a schematic block module diagram of a zero current prediction circuit according to an embodiment of the present invention.

Please refer to FIG. 6, which shows a schematic block module diagram of a zero current prediction circuit 230A according to an embodiment of the present invention. As shown in FIG. 6, the zero current prediction circuit 230A includes: a first comparator 231A, a second comparator 231B and a timer circuit 235. In this embodiment, the first comparator 231A is configured to operably generate a first comparison signal CMP_Vth1 according to a level of the current sensing signal VCS and a first threshold Vth1, whereas, the second comparator 231B is configured to operably generate a second comparison signal CMP_Vth2 according to the level of the current sensing signal VCS and the second threshold Vth2. The zero current prediction circuit 230A is configured to operably generate the first period according to the first comparison signal CMP_Vth1 and the second comparison signal CMP_Vth2. The timer circuit 235 is configured to operably time the first period between when the level of the current sensing signal VCS passes the first threshold Vth1 and when the level of the current sensing signal VCS passes the second threshold Vth2 according to the first comparison signal CMP_Vth1 and the second comparison signal CMP_Vth2, so as to generate a timing signal, and to operably time the second period according to the timing signal, so as to generate a zero current time point signal ZC, wherein there is a ratio (referred to as "period ratio") of the second period to the first period.

In one embodiment, the timer circuit 235 includes: at least one integration capacitor and at least one current source. The zero current prediction circuit 230 is configured to operably control the at least one switch (referring to FIG. 5C) of the power stage circuit by the following steps: when the level of the current sensing signal VCS passes the second threshold Vth2 at a first time point t1, the at least one current source starts charging the at least one integration capacitor from an initial potential to perform a first integration; when the level of the current sensing signal VCS passes the first threshold Vth1 at a second time point t2, the at least one current source stops executing the first integration on the at least one integration capacitor, and the at least one current source starts charging the at least one integration capacitor to perform a second integration, wherein the at least one integration capacitor generates a first integration voltage Vsrc at the second time point, wherein a time span between the first time point t1 and the second time point t2 is the first period Tsrc; and during the second integration, a third time point t3 is determined according to a voltage of the at least one integration capacitor and the first integration voltage Vsrc, wherein a time span between the second time point t2 and the third time point t3 is the second period Tdst, and wherein the third time point t3 corresponds to the zero current time point. In the above description, the step of determining the third time point t3 according to the first integration voltage Vsrc for example can be achieved by: when the level of the current sensing signal VCS passes the third time point t3, the at least one current source stops executing the second integration on the at least one integration capacitor.

Figure 7:
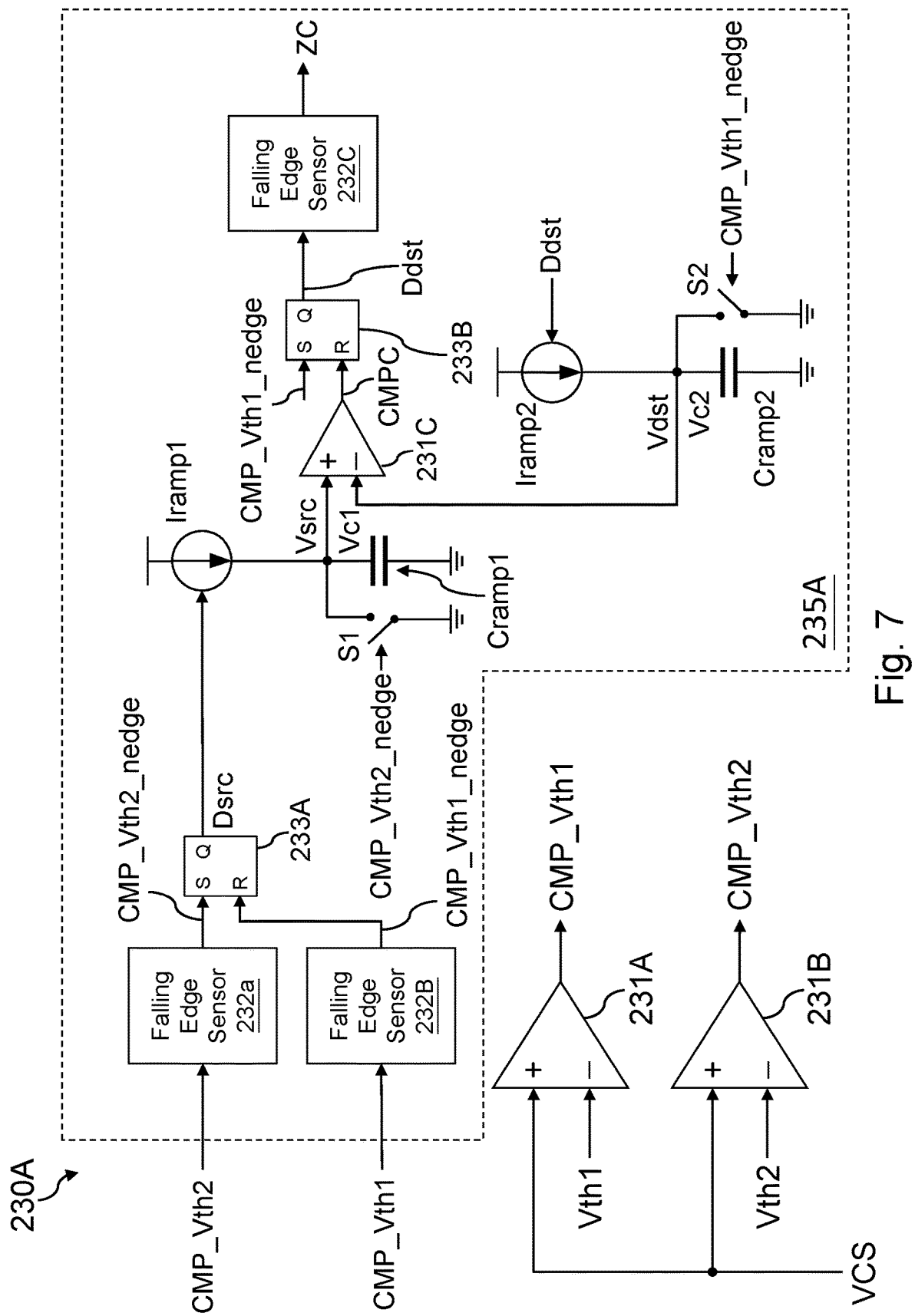
FIG. 7 shows a schematic circuit diagram of a zero current prediction circuit according to an embodiment of the present invention.
Figure 8:
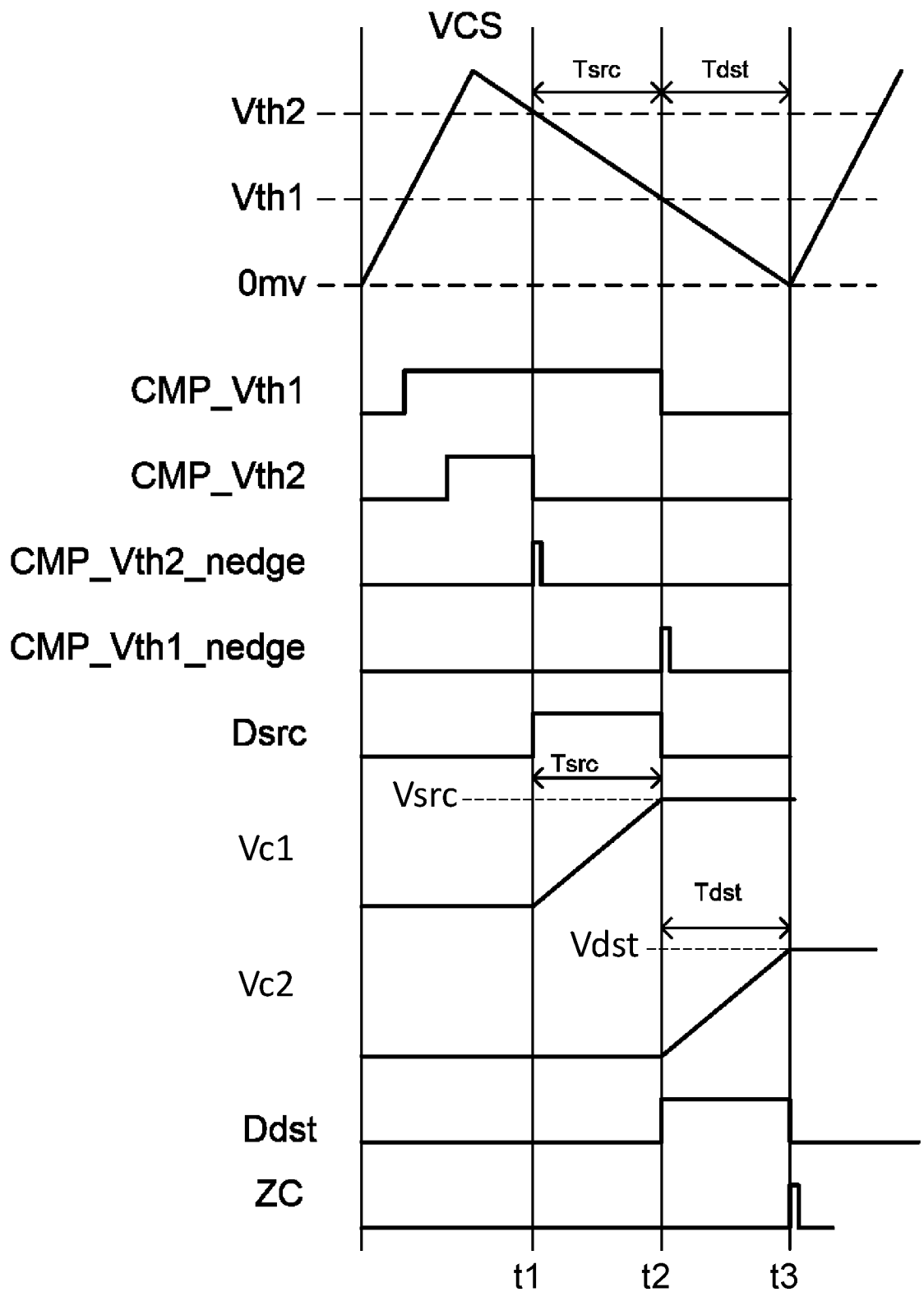
FIG. 8 illustrates a signal waveform diagram depicting the operation of a zero current prediction circuit according to an embodiment of the present invention.

Please refer to FIG. 7 in conjugation with FIG. 8. FIG. 7 shows a schematic circuit diagram of a zero current prediction circuit 230A according to an embodiment of the present invention. FIG. 8 illustrates a signal waveform diagram depicting the operation of a zero current prediction circuit 230A according to an embodiment of the present invention. In this embodiment, the current sensing signal VCS is in-phase with the current $I_L$ flowing through the inductor L. In one embodiment, the zero current prediction circuit 230A includes: a first comparator 231A, a second comparator 231B and a timer circuit 235. Comparators are well known circuit components to those skilled in the art, so the details of the first comparator 231A and the second comparator 231B re not redundantly explained here. In one embodiment, the first comparator 231A is configured to operably generate a first comparison signal CMP_Vth1 according to a level of the current sensing signal VCS and a first threshold Vth1, whereas, the second comparator 231B is configured to operably generate a second comparison signal CMP_Vth2 according to the level of the current sensing signal VCS and the second threshold Vth2. The zero current prediction circuit 230A is configured to operably generate the first period Tsrc according to the first comparison signal CMP_Vth1 and the second comparison signal CMP_Vth2. The following descriptions will explain the configuration of the zero current prediction circuit 230 by three embodiments and will explain the steps as to how the zero current prediction circuit 230 controls the at least one switch of the power stage circuit 210.

As shown in FIG. 7, in this embodiment, the zero current prediction circuit 230A includes: a first comparator 231A, a second comparator 231B and a timer circuit 235. The timer circuit 235 includes: a first integration capacitor Cramp1, a second integration capacitor Cramp2, a first current source Iramp1, a second current source Iramp2, a third comparator 231C, falling edge sensors 232A, 232B and 232C, and latch circuits 233A and 233B, wherein the third comparator 231C is configured to operably compare the first integration voltage Vsrc with a voltage Vc2 of the second integration capacitor Cramp2, to generate a third comparison signal CMPC.

As shown in FIG. 7, in one embodiment, when the level of the current sensing signal VCS is decreased to pass the second threshold Vth2 at the first time point t1, the first integration capacitor Cramp1 is reset to an initial potential by a falling edge pulse CMP_Vth2_nedge of the second comparison signal CMP_Vth2, and the first current source Iramp1 starts charging the first integration capacitor Cramp1 to perform the first integration, to generate a voltage Vc1 of the first integration capacitor Cramp1. In this case, the voltage Vc1 of the first integration capacitor Cramp1 is gradually increased. The initial potential can be for example zero potential. Subsequently, when the level of the current sensing signal VCS is decreased to pass the first threshold Vth1 at the second time point t2, the first current source Iramp1 stops executing the first integration on the first integration capacitor Cramp1. In this case, the voltage Vc1 of the first integration capacitor Cramp1 is the first integration voltage Vsrc. In the meantime, the second integration capacitor Cramp2 is reset to an initial potential by a falling edge pulse CMP_Vth1_nedge of the first comparison signal CMP_Vth1, and the second current source Iramp2 starts charging the second integration capacitor Cramp2 to perform the second integration, so that the voltage Vc2 of the second integration capacitor Cramp2 is gradually increased. Subsequently, when the level of the voltage Vc2 of the second integration capacitor Cramp2 reaches for example the level of the first integration voltage Vsrc (i.e., the second integration voltage Vdst), the second current source Iramp2 can for example stop executing the second integration on the second integration capacitor Cramp2. In this case, the third comparison signal CMPC will indicate that this situation occurs at the third time point t3, that is, the third time point t3 indicates the zero current time point of the inductor L. Further, the timer circuit 235A will output the zero current time point signal ZC at the third time point t3 via the falling edge sensor 232C, so as to control the at least one switch (e.g., as shown by the transistor Q1 in FIG. 4A) of the power stage circuit 210 accordingly, for example to turn ON the at least one switch, to operate in BCM. In this embodiment, the period ratio of the first period Tsrc to the second period Tdst is related to the current source ratio of the first current source Iramp1 to the second current source Iramp2 and the capacitance ratio of the capacitance of the first integration capacitor Cramp1 to the capacitance of the second integration capacitor Cramp2. In one embodiment, preferably, the period ratio of the first period Tsrc to the second period Tdst is 1:1 (i.e., the length of the first period Tsrc is equal to the length of the second period Tdst). Besides, an absolute value of the difference between the first threshold Vth1 and the second threshold Vth2 is equal to an absolute value of the difference between the first threshold Vth1 and the zero potential, so as to achieve volt-second balance. In addition, in steady state, the inductor L starts its conduction from zero current. Moreover, the zero current time point can be predicted by directly replicating the first period Tsrc to become the second period Tdst. In another embodiment, an absolute value of the difference between the first threshold Vth1 and the second threshold Vth2 is smaller than the peak-to-peak value of the current sensing signal VCS. In another embodiment, an absolute value of the difference between the first threshold Vth1 and the second threshold Vth2 is smaller than ½-fold of the peak-to-peak value of the current sensing signal VCS.

In one embodiment, because the level of the current sensing signal VCS changes as time changes, within one period, usually, the level of the current sensing signal VCS will pass each of the first threshold Vth1 and the second threshold Vth2 twice at two different time points. That is, the level of the current sensing signal VCS will pass each of the first threshold Vth1 and the second threshold Vth2 at one time point when the current sensing signal VCS is increasing, and the level of the current sensing signal VCS will pass each of the first threshold Vth1 and the second threshold Vth2 at another time point when the current sensing signal VCS is decreasing. Because the purpose of the present invention is to sense the zero current time point of the inductor L, the present invention obtains the information of the first time point t1 and the second time point t2 (as shown by the first time point t1 and the second time point t2 in FIG. 8) when the current sensing signal VCS passes the second threshold Vth2 and passes the first threshold Vth1 while the current $I_L$ flowing through the inductor L is decreasing. In one embodiment, the timer circuit 235A senses the falling edge pulse CMP_Vth2_nedge of the second comparison signal CMP_Vth2 and the falling edge pulse CMP_Vth1_nedge of the first comparison signal CMP_Vth1 by the falling edge sensor 232A and the falling edge sensor 232B, respectively, so as to sense the first time point t1 and the second time point t2, thereby generating the first period Tsrc, wherein the falling edge pulse CMP_Vth2_nedge of the second comparison signal CMP_Vth2 corresponds to the first time point t1, whereas, the falling edge pulse CMP_Vth1_nedge of the first comparison signal CMP_Vth1 corresponds to the second time point t2.

Figure 9A:
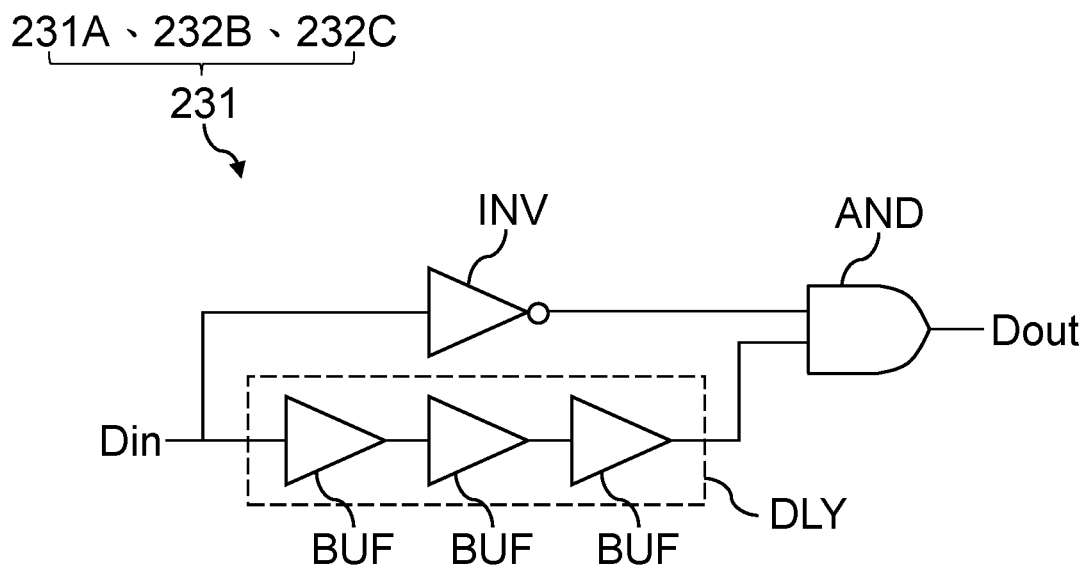
FIG. 9A shows a schematic circuit diagram of a falling edge sensor according to an embodiment of the present invention.
Figure 9B:
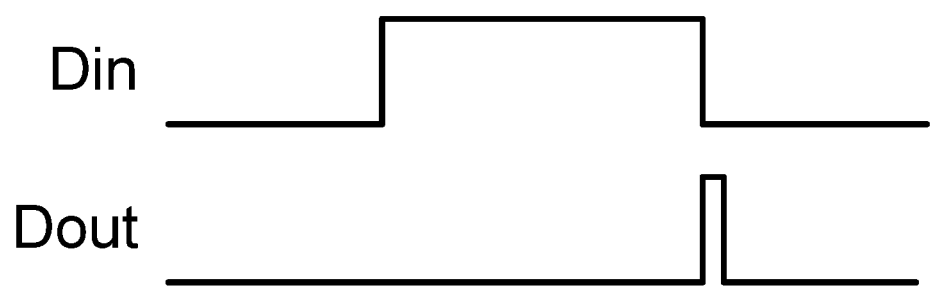
FIG. 9B is a signal waveform diagram illustrating an input end voltage waveform and an output end voltage waveform of the falling edge sensor according to an embodiment of the present invention.

Please refer to FIG. 9A in conjugation with FIG. 9B. FIG. 9A shows a schematic circuit diagram of a falling edge sensor 232 according to an embodiment of the present invention. The falling edge sensor 232 includes the above-mentioned falling edge sensors 232A, 232B and 232C. FIG. 9B illustrates a signal waveform diagram illustrating an input end voltage waveform of the falling edge sensor 232 and an output end voltage waveform of the falling edge sensor 232 according to an embodiment of the present invention. As shown in FIG. 9A and FIG. 9B, in one embodiment, the falling edge sensor 232 includes: a delay circuit DLY including an inverter INV and buffers BUF and an AND gate AND. The falling edge sensor 232 senses the falling edge of an input signal Din, to generate an output signal Dout in the form of a pulse. The output signal Dout corresponds to the falling edge of the input signal Din. The pulse width of the output signal Dout is correlated with the delay period of the delay circuit DLY.

In one embodiment, the falling edge pulse CMP_Vth1_nedge of the first comparison signal CMP_Vth1 and the falling edge pulse CMP_Vth2_nedge of the second comparison signal CMP_Vth2 are configured to respectively reset the first integration capacitor Cramp1 and the second integration capacitor Cramp2 to the initial potential. As shown in FIG. 8, at the first time point t1, the falling edge pulse CMP_Vth2_nedge of the second comparison signal CMP_Vth2 controls a switch S1 to be ON, so that the first integration capacitor Cramp1 is connected to ground and is thereby reset to an initial potential having low level. On the other hand, at the second time point t2, the falling edge pulse CMP_Vth1_nedge of the first comparison signal CMP_Vth1 controls a switch S2 to be ON, so that the second integration capacitor Cramp2 is connected to ground and is thereby reset to an initial potential having low level.

In one embodiment, the timer circuit 235A controls the first current source Iramp1 and the second current source Iramp2 via a first latch signal Dsrc generated by a latch circuit 233A and a second latch signal Ddst generated by a latch circuit 233B, respectively. When the first latch signal Dsrc is at high level, the first current source Iramp1 starts charging the first integration capacitor Cramp1 to perform the first integration. On the other hand, when the second latch signal Ddst is at high level, the second current source Iramp2 starts charging the second integration capacitor Cramp2 to perform the second integration. Latch circuits are well known to those skilled in the art, so the details of the latch circuit 233A and the latch circuit 233B are not redundantly explained here.

Figure 10:
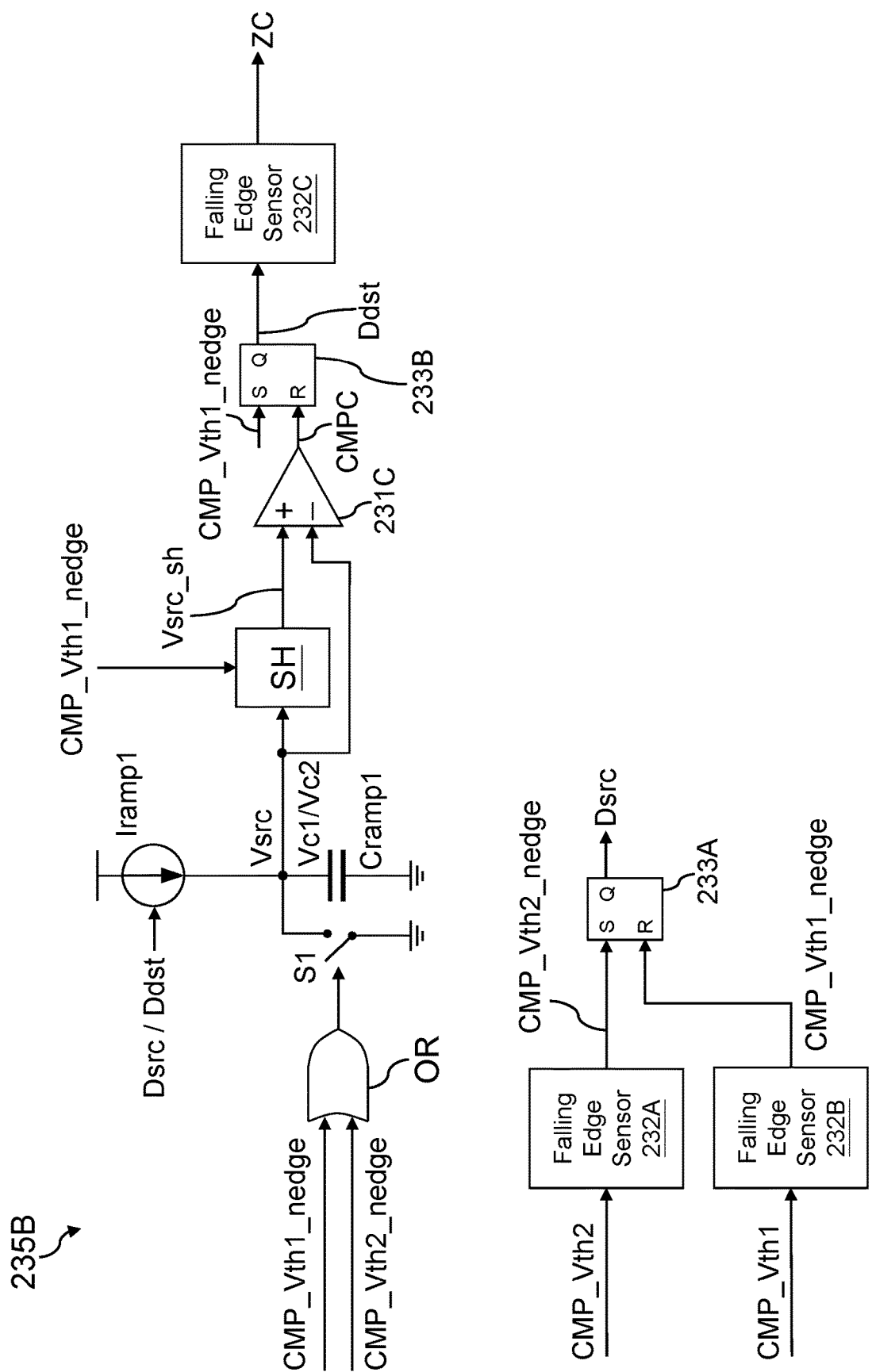
FIG. 10 shows a schematic circuit diagram (1) of a timer circuit according to another embodiment of the present invention.
Figure 11:
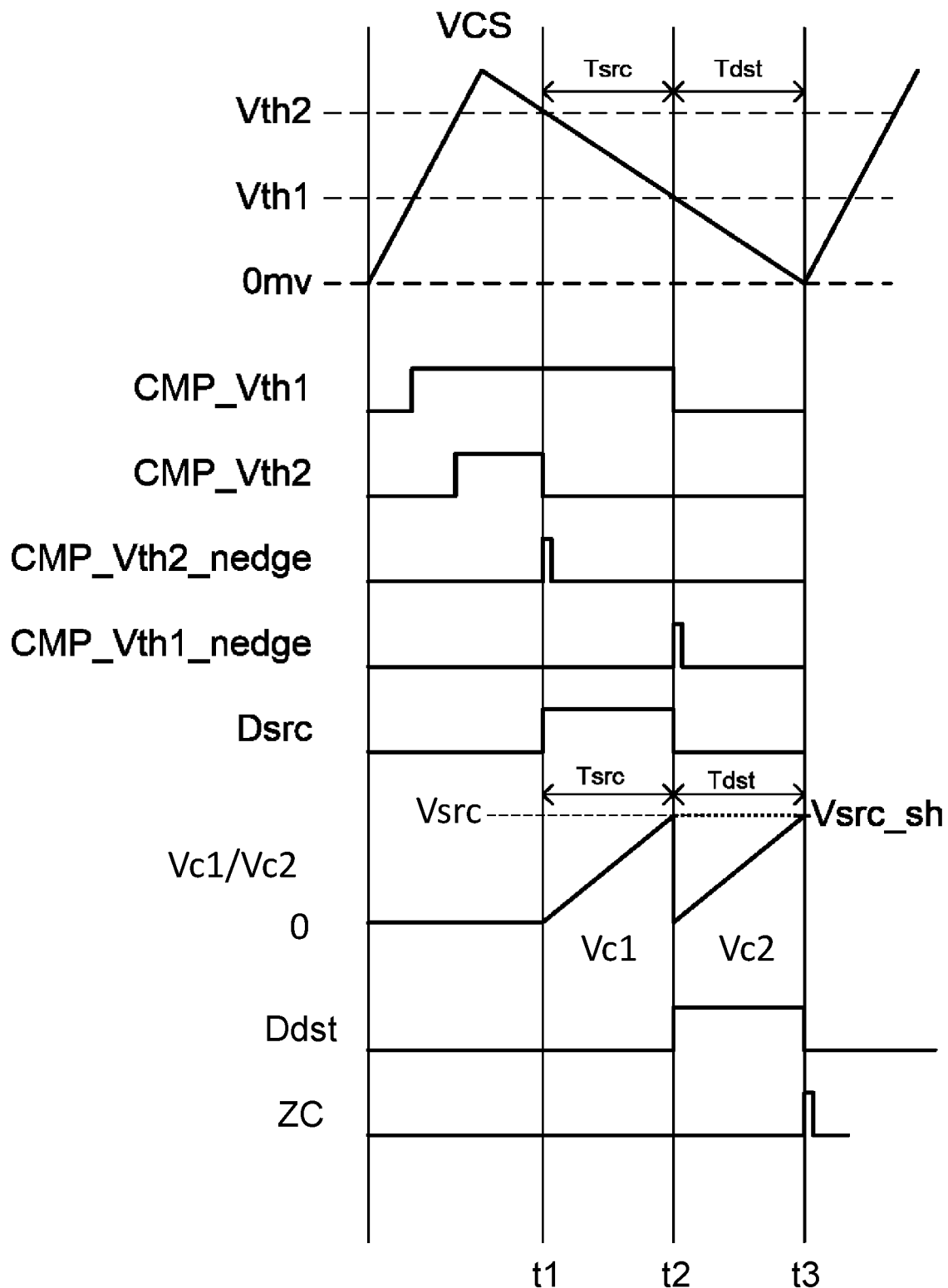
FIG. 11 illustrates a signal waveform diagram depicting the operation of a zero current prediction circuit according to another embodiment of the present invention.

Please refer to FIG. 10 in conjugation with FIG. 11. FIG. 10 shows a schematic circuit diagram (1) of a timer circuit 235B according to another embodiment of the present invention. FIG. 11 illustrates a signal waveform diagram depicting the operation of a zero current prediction circuit 230B according to another embodiment of the present invention, wherein the current sensing signal VCS is in-phase with the current $I_L$ flowing through the inductor L. As shown in FIG. 10, in this embodiment, the timer circuit 235B includes: a sample-and-hold circuit SH, a first integration capacitor Cramp1, a first current source Iramp1, a third comparator 231C, falling edge sensors 232A, 232B and 232C, and latch circuits 233A and 233B. The sample-and-hold circuit SH is configured to operably sample-and-hold a first integration voltage Vsrc, to generate a sample-and-hold voltage Vsrc_sh. The third comparator 231C is configured to operably compare the sample-and-hold voltage Vsrc_sh with the voltage Vc1 of the first integration capacitor Cramp1, to generate the third comparison signal CMPC. In one embodiment, the zero current prediction circuit 230B further includes: a first comparator 231A and a second comparator 231B. The first comparator 231A and the second comparator 231B operate in the same way as in the previous embodiment, so the details thereof are not redundantly repeated here.

As shown in FIG. 11, in one embodiment, when the level of the current sensing signal VCS passes the second threshold Vth2 at the first time point t1, the first integration capacitor Cramp1 is reset to an initial potential, and the first current source Iramp1 starts charging the first integration capacitor Cramp1 to perform the first integration, to generate the voltage Vc1 of the first integration capacitor Cramp1. In this case, the voltage Vc1 of the first integration capacitor Cramp1 is gradually increased. The initial potential can be for example zero potential. Subsequently, when the level of the current sensing signal VCS passes the first threshold Vth1 at the second time point t2, the voltage Vc1 of the first integration capacitor Cramp1 reaches the first integration voltage Vsrc, whereby the sample-and-hold circuit SH samples-and-holds the first integration voltage Vsrc, to generate the sample-and-hold voltage Vsrc_sh. Besides, the first current source Iramp1 stops executing the first integration on the first integration capacitor Cramp1. At the same time point (i.e., the second time point t2), the first integration capacitor Cramp1 is reset to the initial potential, and the first current source Iramp1 starts charging the first integration capacitor Cramp1 to perform the second integration, to generate the voltage Vc2. Subsequently, when the level of the voltage Vc2 reaches the level of the sample-and-hold voltage Vsrc_sh, the third comparison signal CMPC will indicate that this situation occurs at the third time point t3, that is, the third time point t3 indicates the zero current time point of the inductor L. At this time point t3, the first current source Iramp1 stops executing the second integration on the first integration capacitor Cramp1. Further, the timer circuit 235B will output the zero current time point signal ZC at the third time point t3 via the falling edge sensor 232C, so as to control the at least one switch (e.g., as shown by the transistor Q1 in FIG. 4A) of the power stage circuit 210, for example to turn ON the at least one switch again, to operate in BCM.

In one embodiment, the timer circuit 235B senses a falling edge pulse CMP_Vth2_nedge of the second comparison signal CMP_Vth2 and a falling edge pulse CMP_Vth1_nedge of the first comparison signal CMP_Vth1 by the falling edge sensor 232A and the falling edge sensor 232B, respectively, so as to sense the first time point t1 and the second time point t2, thereby generating the first period Tsrc, wherein the falling edge pulse CMP_Vth2_nedge of the second comparison signal CMP_Vth2 corresponds to the first time point t1, whereas, the falling edge pulse CMP_Vth1_nedge of the first comparison signal CMP_Vth1 corresponds to the second time point t2.

In one embodiment, the falling edge pulse CMP_Vth1_nedge of the first comparison signal CMP_Vth1 and the falling edge pulse CMP_Vth2_nedge of the second comparison signal CMP_Vth2 serve to reset the first integration capacitor Cramp1 to the initial potential. As shown in FIG. 10, because the falling edge pulse CMP_Vth1_nedge of the first comparison signal CMP_Vth1 and the falling edge pulse CMP_Vth2_nedge of the second comparison signal CMP_Vth2 controls a switch S1 via an OR gate OR, when either one of the falling edge pulse CMP_Vth1_nedge of the first comparison signal CMP_Vth1 and the falling edge pulse CMP_Vth2_nedge of the second comparison signal CMP_Vth2 is switched high level, the switch S1 is turned ON. As shown in FIG. 11, at the first time point t1, the falling edge pulse CMP_Vth2_nedge of the second comparison signal CMP_Vth2 controls the switch S1 to be ON, so that the first integration capacitor Cramp1 is connected to ground, whereby the first integration capacitor Cramp1 is reset to an initial potential having low level. On the other hand, at the second time point t2, the falling edge pulse CMP_Vth1_nedge of the first comparison signal CMP_Vth1 controls the switch S1 to be ON, so that the first integration capacitor Cramp1 is once again connected to ground, and reset to the initial potential having low level.

In one embodiment, the timer circuit 235B controls the first current source Iramp1 via a first latch signal Dsrc generated by the latch circuit 233A and a second latch signal Ddst generated by the latch circuit 233B. When the first latch signal Dsrc is at high level, the first current source Iramp1 starts charging the first integration capacitor Cramp1 to perform the first integration. On the other hand, when the second latch signal Ddst is at high level, the first current source Iramp1 starts charging the first integration capacitor Cramp1 to perform the second integration.

Figure 12:
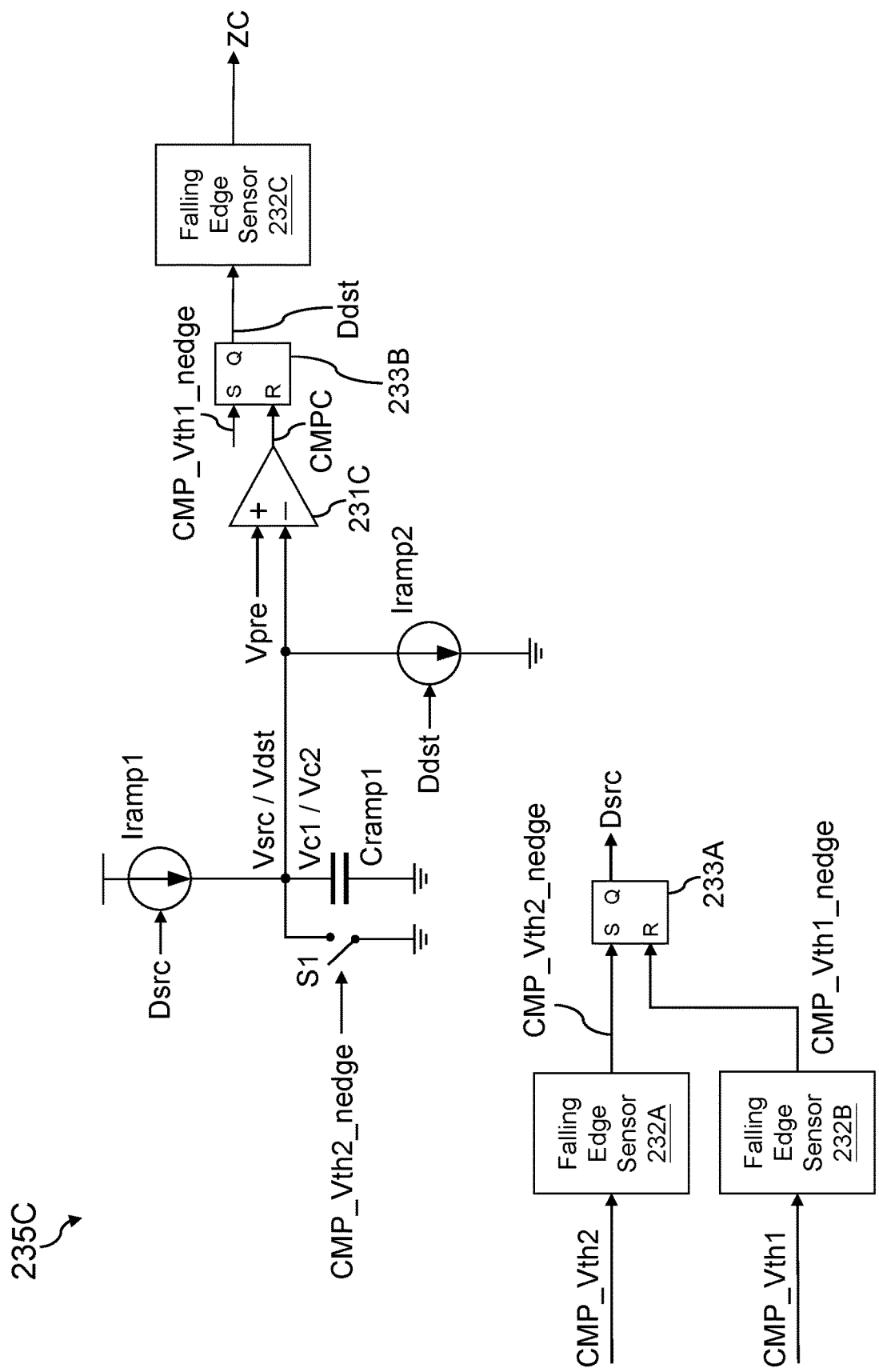
FIG. 12 shows a schematic circuit diagram (2) of a timer circuit according to another embodiment of the present invention.

Please refer to FIG. 12 which shows a schematic circuit diagram (2) of a timer circuit 235C according to another embodiment of the present invention. As shown in FIG. 12, in this embodiment, the timer circuit 235C includes: a first integration capacitor Cramp1, a first current source Iramp1, a second current source Iramp2, a third comparator 231C, falling edge sensors 232A, 232B and 232C and latch circuits 233A and 233B. The third comparator 231C is configured to operably compare a voltage Vc1 or Vc2 of the first integration capacitor Cramp1 with a predetermined potential Vpre, to generate a third comparison signal CMPC, wherein the voltage across the first integration capacitor Cramp1 can be Vc1 or Vc2. In one embodiment, the zero current prediction circuit 230C further includes: a first comparator 231A and a second comparator 231B. The first comparator 231A and the second comparator 231B operate in the same way as in the previous embodiment, so the details thereof are not redundantly repeated here.

In one embodiment, when the level of the current sensing signal VCS passes the second threshold Vth2 at the first time point t1, the first integration capacitor Cramp1 is reset to an initial potential, and the first current source Iramp1 starts charging the first integration capacitor Cramp1 to perform the first integration, to generate a voltage Vc1. In this case, the voltage Vc1 is gradually increased. The initial potential can be for example zero potential (e.g., as shown by the ground potential in FIG. 12). Subsequently, when the level of the current sensing signal VCS passes the first threshold Vth1 at the second time point t2, the first current source Iramp1 stops executing the first integration on the first integration capacitor Cramp1. At this time point t2, the voltage Vc1 reaches the first integration voltage Vsrc, and in the mean time, the second current source Iramp2 starts charging the first integration capacitor Cramp1 to perform the second integration, wherein the voltage Vc2 of the first integration capacitor Cramp1 is gradually decreased. Subsequently, when the level of the second integration voltage Vdst reaches the level of the predetermined potential Vpre, the third comparison signal CMPC will indicate that this situation occurs at the third time point t3, that is, the third time point t3 indicates the zero current time point of the inductor L. The predetermined potential Vpre can be for example zero potential or any potential other than zero. At this time point t3, the second current source Iramp2 stops executing the second integration on the first integration capacitor Cramp1. In one embodiment, the initial potential and the predetermined potential Vpre are the same potential. Further, the timer circuit 235C will output the zero current time point signal ZC at the third time point t3 via the falling edge sensor 232C, so as to control the at least one switch (e.g., as shown by the transistor Q1 in FIG. 4A) of the power stage circuit 210, for example to turn ON the at least one switch again, to operate in BCM. In this embodiment, the period ratio of the first period Tsrc to the second period Tdst is related to the current source ratio of the first current source Iramp1 to the second current source Iramp2. In one embodiment, preferably, the period ratio of the first period Tsrc to the second period Tdst is 1:1.

In one embodiment, the timer circuit 235C senses a falling edge pulse CMP_Vth2_nedge of the second comparison signal CMP_Vth2 and a falling edge pulse CMP_Vth1_nedge of the first comparison signal CMP_Vth1 by the falling edge sensor 232A and the falling edge sensor 232B, respectively, so as to sense the first time point t1 and the second time point t2, thereby generating the first period Tsrc, wherein the falling edge pulse CMP_Vth2_nedge of the second comparison signal CMP_Vth2 corresponds to the first time point t1, whereas, the falling edge pulse CMP_Vth1_nedge of the first comparison signal CMP_Vth1 corresponds to the second time point t2.

In one embodiment, the falling edge pulse CMP_Vth2_nedge of the second comparison signal CMP_Vth2 serves to reset the first integration capacitor Cramp1 to the initial potential. When the level of the current sensing signal VCS passes the second threshold Vth2 at the first time point t1, the falling edge pulse CMP_Vth2_nedge of the second comparison signal CMP_Vth2 controls the switch S1 to be ON, so that the first integration capacitor Cramp1 is connected to ground, whereby the first integration capacitor Cramp1 is reset to an initial potential having low level.

In one embodiment, the timer circuit 235C controls the first current source Iramp1 and the second current source Iramp2 via a first latch signal Dsrc generated by the latch circuit 233A and a second latch signal Ddst generated by the latch circuit 233B, respectively. When the first latch signal Dsrc is at high level, the first current source Iramp1 starts charging the first integration capacitor Cramp1 to perform the first integration. On the other hand, when the second latch signal Ddst is at high level, the second current source Iramp2 starts charging the second integration capacitor Cramp2 to perform the second integration.

Please refer back to FIG. 4A and FIG. 4B. In one embodiment, the feedback circuit 240 generates a feedback voltage Vfb according to the output power, wherein the feedback voltage Vfb is proportional to the output voltage Vo of the output power so that there is a ratio between the feedback voltage Vfb and the output voltage Vo. In one embodiment, the feedback circuit 240 includes a voltage-divider circuit constituted by resistors, wherein resistances of the resistors determine the above-mentioned ratio. As shown in FIG. 4A, in this embodiment, the feedback circuit 240 includes: a resistor Rfb1 and a resistor Rfb2, wherein the resistance of the resistor Rfb1 and the resistance of the resistor Rfb2 decide the ratio of the output voltage Vo to the feedback voltage Vfb. For example, when the resistor Rfb1 has a resistance equal to 4 k ohm (kΩ), whereas, when the resistor Rfb2 has a resistance equal to 1 k ohm (kΩ), the ratio of the output voltage Vo to the feedback voltage Vfb is 5:1. That is, the level of the output voltage Vo is 5-fold of the level of the feedback voltage Vfb.

In one embodiment, the rectifier 250 serves to rectify an AC input power to become a rectified power. The rectified voltage Vi of the rectified power is a half-wave signal or a full-wave signal. In a case wherein the rectified voltage Vi is a half-wave signal, it indicates that the rectifier 250 removes the negative voltage portion in an AC input voltage Vac of the AC input power when rectifying the AC input voltage Vac to become the rectified voltage Vi. On the other hand, in a case wherein the rectified voltage Vi is a full-wave signal, it indicates that the rectifier 250 converts the negative voltage portion in the AC input voltage Vac to a positive voltage portion when rectifying the AC input voltage Vac to become the rectified voltage Vi. The configuration and function of a rectifier are well known to those skilled in the art, so the details of the rectifier 250 are not redundantly explained here.

As shown in FIG. 4B, in one embodiment, the error amplifier 260 is configured to operably generate an error amplification signal VEOA according to a difference between the reference voltage Vref and the feedback voltage Vfb. In one embodiment, the error amplifier 260 has a non-inverting input end, an inverting input end, and an output end. The non-inverting input end serves to receive the reference voltage Vref. The non-inverting input end serves to receive the feedback voltage Vfb. The output end serves to output the error amplification signal VEOA. The configuration and function of an error amplifier are well known to those skilled in the art, so the details of the error amplifier 260 are not redundantly explained here.

In one embodiment, the PWM circuit 270 is configured to operably execute a pulse-width modulation on the zero current time point signal ZC according to the error amplification signal VEOA, to generate a control signal G1. In one embodiment, the PWM circuit 270 executes a pulse-width modulation according to the error amplification signal VEOA so that the generated control signal G1 control the power stage circuit 210 to operate in constant conduction mode (CCM). Pulse-width modulation is well known to those skilled in the art, so the details thereof are not redundantly explained here.

Figure 13:
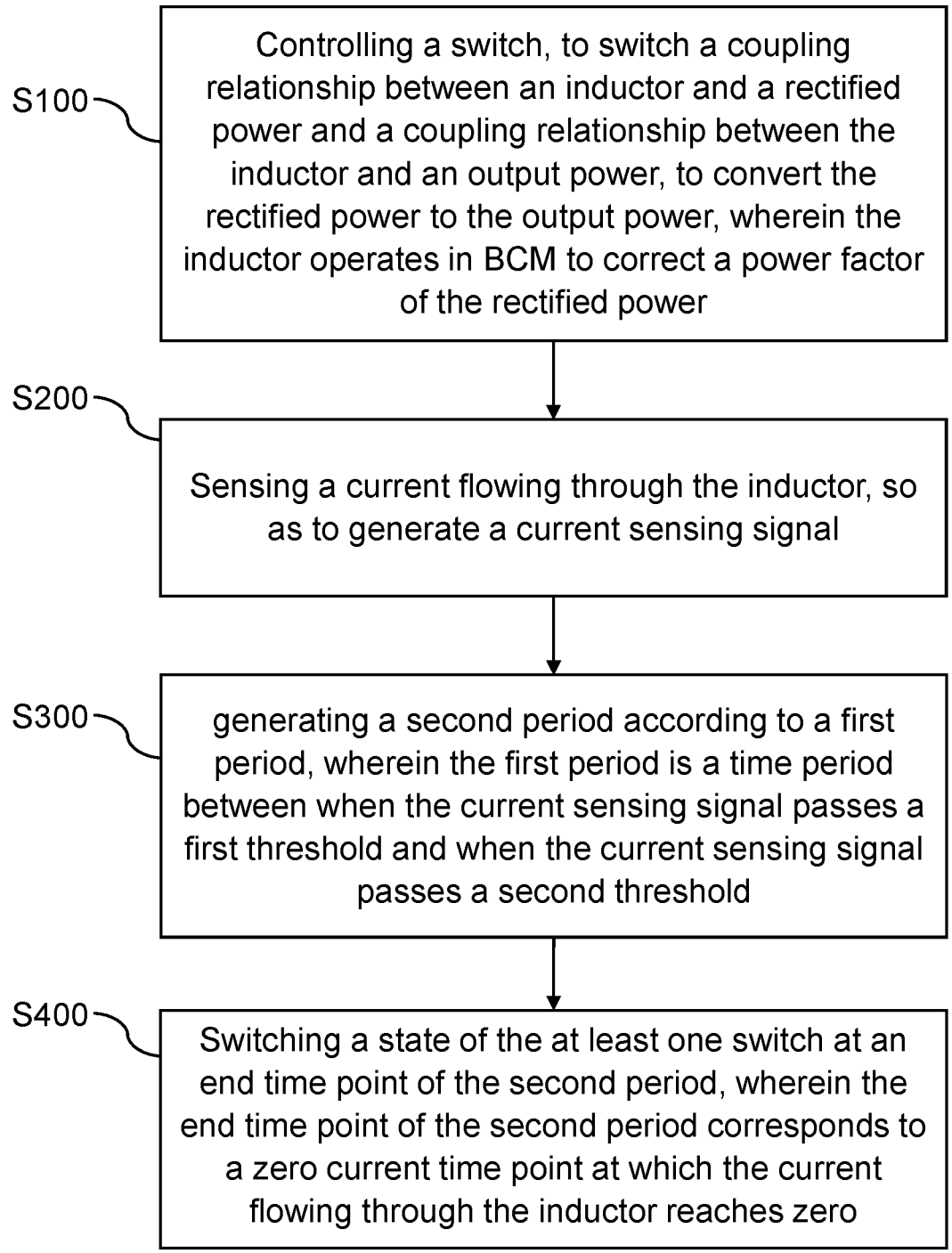
FIG. 13 shows a flowchart diagram of a control method of a power factor correction converter according to an embodiment of the present invention.

Please refer to FIG. 13, which shows a flowchart diagram of a control method of the power factor correction converter 200 according to an embodiment of the present invention. When the power factor correction converter 200 begins to operate in a boundary conduction mode (BCM), the power stage circuit 210 of the power factor correction converter 200 receives a rectified power to generate a current $I_L$ flowing through an inductor L, wherein the rectified power is generated by a rectifier 250 which converts an AC input power to the rectified power. As shown in FIG. 13, the control method includes: first, controlling a switch Q1, so as to switch a coupling relationship between the inductor L and the rectified power and a coupling relationship between the inductor L and an output power, to convert the rectified power to the output power, wherein the inductor L operates in the BCM to correct a power factor of the rectified power (step S100). Next, the current sensing circuit 220 of the power factor correction converter 200 senses the current $I_L$ flowing through the inductor L to generate a current sensing signal VCS, in the way as explained in the foregoing embodiments, so the details thereof are not redundantly repeated here (step S200). Next, when the level of the current sensing signal VCS passes the first threshold Vth1 and the second threshold Vth2, the zero current prediction circuit 230 of the power factor correction converter 200 generates generates the second period Tdst according to the first period Tsrc, wherein the first period Tsrc is a time period between when the current sensing signal VCS passes the first threshold Vth1 and when the current sensing signal VCS passes the second threshold Vth2 (step S300), in the way as explained in the foregoing embodiments, so the details thereof are not redundantly repeated here. Further, the zero current prediction circuit 230 of the power factor correction converter 200 switches the state of the at least one switch of the power stage circuit 210 at an end time point of the second period Tdst (i.e., the time point at which the level of the current $I_L$ flowing through the inductor L becomes zero), to convert the rectified power to the output power (step S400), in the way as explained in the foregoing embodiments, so the details thereof are not redundantly repeated here.

Figure 14:
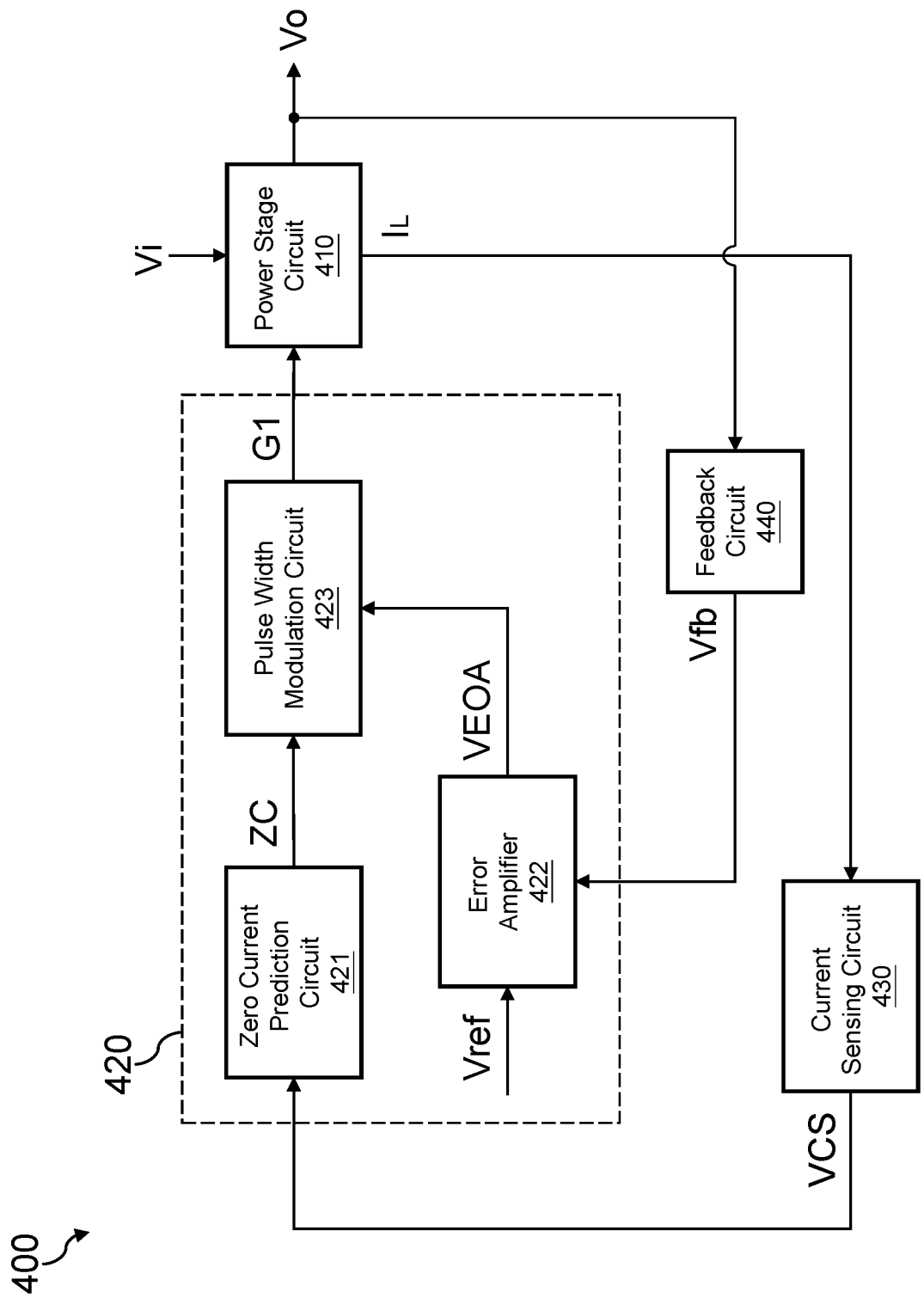
FIG. 14 shows a schematic block module diagram of a power factor correction controller according to an embodiment of the present invention.

Please refer to FIG. 14, which shows a schematic block module diagram of a power factor correction controller 420 according to an embodiment of the present invention, wherein the power factor correction controller 420 is for use in a power factor correction converter 400. As shown in FIG. 14, in one embodiment, the power factor correction converter 400 comprises: a power stage circuit 410, the power factor correction controller 420, a current sensing circuit 430, and a feedback circuit 440, wherein the power factor correction controller 420 includes a zero current prediction circuit 421. In one embodiment, the power factor correction controller 420 further includes: an error amplifier 422 and a pulse width modulation (PWM) circuit 423. In one embodiment, the power factor correction converter 400 of FIG. 14 corresponds to the power factor correction converter 200 of FIG. 4A. The power stage circuit 410, the current sensing circuit 430 and the feedback circuit 440 of FIG. 14 correspond to the power stage circuit 210, the current sensing circuit 220 and the feedback circuit 240 of FIG. 4A. The zero current prediction circuit 421 of FIG. 14 corresponds to the zero current prediction circuit 230 of FIG. 4A. The error amplifier 422 and the PWM circuit 423 of FIG. 14 corresponds to the error amplifier 260 and the PWM circuit 270 of FIG. 4B.

In light of above, as compared to the prior art, because the power factor correction converter 200 of the present invention includes the zero current prediction circuit 230, the power factor correction converter 200 of the present invention can precisely sense the zero current time point of the inductor L, whereby the power factor correction converter 200 of the present invention can stably operate in BCM.

It is worthwhile noting that: "the end time point of the second period corresponds to a zero current time point at which the current flowing through the inductor reaches zero", as described in the present invention, does not require the end time point of the second period to absolutely precisely correspond to the zero current time point at which the current flowing through the inductor reaches zero with zero tolerance. In other words, according to the present invention, an insignificant error within a tolerable range is acceptable. Similarly, "a length of the first period is equal to a length of the second period", as described in the present invention, does not require that the length of the first period must absolutely be equal to the length of the second period with zero tolerance; an insignificant error within a tolerable range is acceptable. Likewise, in regard to the term "time point", the term "time length" and other measurements, an insignificant error within a tolerable range is acceptable.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:
1. A power factor correction converter, comprising:
   a power stage circuit including at least one switch, wherein the power stage circuit is configured to operably switch a coupling relationship between an inductor and a rectified power and a coupling relationship between the inductor and an output power, so as to convert the rectified power to the output power, wherein the power stage circuit is configured to operate in a boundary conduction mode (BCM) to correct a power factor of the rectified power;

a current sensing circuit, which is configured to operably sense a current flowing through the inductor, so as to generate a current sensing signal; and a zero current prediction circuit, which is configured to operably control the at least one switch;

wherein the zero current prediction circuit is configured to operably control the at least one switch by steps including:

generating a second period according to a first period, wherein the first period is a time period between when the current sensing signal passes a first threshold and when the current sensing signal passes a second threshold; and switching a state of the at least one switch at an end time point of the second period, wherein the end time point of the second period corresponds to a zero current time point at which the current flowing through the inductor reaches zero.

2. The power factor correction converter of claim 1, further comprising:

a feedback circuit, which is configured to operably generate a feedback voltage according to the output power;

an error amplifier, which is configured to operably generate an error amplification signal according to a difference between a reference voltage and the feedback voltage; and a pulse width modulation (PWM) circuit, which is configured to operably generate a control signal according to the error amplification signal and a signal related to the zero current time point, wherein the control signal is configured to operably control the at least one switch.

3. The power factor correction converter of claim 1, wherein a length of the first period is equal to a length of the second period.

4. The power factor correction converter of claim 1, wherein an absolute value of a difference between the first threshold and the second threshold is smaller than a peak-to-peak value of the current sensing signal.

5. The power factor correction converter of claim 1, wherein an absolute value of a difference between the first threshold and the second threshold is smaller than ½-fold of a peak-to-peak value of the current sensing signal.

6. The power factor correction converter of claim 1, wherein the zero current prediction circuit includes:

a first comparator and a second comparator;

wherein the first comparator is configured to operably generate a first comparison signal according to a level of the current sensing signal and the first threshold;

wherein the second comparator is configured to operably generate a second comparison signal according to the level of the current sensing signal and the second threshold;

wherein the zero current prediction circuit is configured to operably generate the first period according to the first comparison signal and the second comparison signal.

7. The power factor correction converter of claim 6, wherein the zero current prediction circuit further includes:

a timer circuit, which is configured to operably timing the first period between when the level of the current sensing signal passes the first period and when the level of the current sensing signal passes the second threshold according to the first comparison signal and the second comparison signal, so as to generate a timing signal, and the timer circuit is further configured to operably timing the second period according to the timing signal, wherein the second period has a period ratio to the first period.

8. The power factor correction converter of claim 7, wherein the timer circuit includes: at least one integration capacitor and at least one current source;

wherein the zero current prediction circuit is configured to operably control the at least one switch by steps including:

when the level of the current sensing signal passes the second threshold at a first time point, the at least one current source starts charging the at least one integration capacitor to perform a first integration from an initial potential;

when the level of the current sensing signal passes the first threshold at a second time point, the at least one current source stops executing the first integration on the at least one integration capacitor, wherein the at least one integration capacitor generates a first integration voltage at the second time point;

starting from the second time point, the at least one current source starts charging the at least one integration capacitor to perform a second integration, wherein a time span between the first time point and the second time point is the first threshold; and during a second integration period, determining a third time point according to a voltage of the at least one integration capacitor and the first integration voltage, wherein a time span between the second time point and the third time point is the second threshold, and wherein the third time point corresponds to the zero current time point.

9. The power factor correction converter of claim 8, wherein an absolute value of a difference between the first threshold and the second threshold is equal to an absolute value of a difference between the first threshold and the level of the current sensing signal at the third time point.

10. The power factor correction converter of claim 8, wherein the at least one integration capacitor includes: a first integration capacitor and a second integration capacitor, wherein the at least one current source includes: a first current source and a second current source, wherein the timer circuit further includes: a third comparator, which is configured to operably compare the first integration voltage with a voltage of the second integration capacitor, to generate a third comparison signal;

wherein the zero current prediction circuit is configured to operably control the at least one switch by steps including:

at the first time point, resetting a voltage of the first integration capacitor to the initial potential, and the first current source starting charging the first integration capacitor to perform the first integration from the initial potential;

at the second time point, the first current source stopping executing the first integration on the first integration capacitor, so that the first integration capacitor generates the first integration voltage, and at the second time point, resetting a voltage of the second integration capacitor to the initial potential, and the second current source starting charging the second integration capacitor from the initial potential to perform the second integration; and during the second integration period, determining a time point at which the voltage of the second integration capacitor reaches the first integration voltage as the third time point;

wherein the period ratio of the first period to the second period is related to a current source ratio of the first current source to the second current source and a capacitance ratio of a capacitance of the first integration capacitor to a capacitance of the second integration capacitor.

11. The power factor correction converter of claim 8, wherein the timer circuit further includes:
   a sample-and-hold circuit, which is configured to operably sample-and-hold the first integration voltage, to generate a sample-and-hold voltage; and
   a third comparator, which is configured to operably compare the sample-and-hold voltage with a voltage of the at least one integration capacitor, to generate a third comparison signal;
   wherein the zero current prediction circuit is configured to operably control the at least one switch by steps including:
   at the first time point, resetting a voltage of the at least one integration capacitor to the initial potential, and the at least one current source starting charging the at least one integration capacitor to perform the first integration from the initial potential;
   at the second time point, the at least one current source stopping executing the first integration on the at least one integration capacitor, so that the first integration capacitor generates the first integration voltage, and at the second time point, the sample-and-hold circuit sampling-and-holding the first integration voltage, to generate the sample-and-hold voltage; the voltage of the at least one integration capacitor being reset to the initial potential, and the at least one current source starting charging the at least one integration capacitor to perform the second integration from the initial potential;
   during the second integration, when the third comparison signal indicates a time point at which the voltage of the at least one integration capacitor reaches the sample-and-hold voltage, determining such time point indicated by the third comparison signal as the third time point.

12. The power factor correction converter of claim 8, wherein the at least one current source includes: a first current source and a second current source, wherein the timer circuit further includes: a third comparator, which is configured to operably compare a voltage of the at least one integration capacitor with a predetermined potential, to generate a third comparison signal;
   wherein the zero current prediction circuit is configured to operably control the at least one switch by steps including:
   at the first time point, resetting a voltage of the at least one integration capacitor to the initial potential, and the first current source starting charging the at least one integration capacitor to perform the first integration from the initial potential;
   at the second time point, the first current source stopping executing the first integration on the at least one integration capacitor, so that the first integration capacitor generates the first integration voltage; and resetting the voltage of the at least one integration capacitor to the initial potential, and the second current source starting charging the at least one integration capacitor to perform the second integration from the initial potential; and
   during the second integration, when the third comparison signal indicates a time point at which the voltage of the at least one integration capacitor reaches the predetermined potential, determining such time point indicated by the third comparison signal as the third time point;
   wherein the period ratio of the first period to the second period is related to a current source ratio of the first current source to the second current source.

13. A power factor correction controller for use in a power factor correction converter, comprising:
   a zero current prediction circuit, which is configured to operably control at least one switch of a power stage circuit, so as to switch a coupling relationship between an inductor and a rectified power and a coupling relationship between the inductor and an output power, thus converting the rectified power to the output power, wherein the power stage circuit is configured to operate in a boundary conduction mode (BCM) to correct a power factor of the rectified power;
   wherein the zero current prediction circuit is configured to operably control the at least one switch by steps including:
   generating a second period according to a first period, wherein the first period is a time period between when the current sensing signal passes a first threshold and when the current sensing signal passes a second threshold; and
   switching a state of the at least one switch at an end time point of the second period, wherein the end time point of the second period corresponds to a zero current time point at which the current flowing through the inductor reaches zero;
   an error amplifier, which is configured to operably generate an error amplification signal according to a difference between a reference voltage and the feedback voltage; and
   a pulse width modulation (PWM) circuit, which is configured to operably generate a control signal according to the error amplification signal and a signal related to the zero current time point, wherein the control signal is configured to operably control the at least one switch.

14. The power factor correction controller of claim 13, wherein a length of the first period is equal to a length of the second period.

15. The power factor correction controller of claim 13, wherein an absolute value of a difference between the first threshold and the second threshold is smaller than a peak-to-peak value of the current sensing signal.

16. The power factor correction controller of claim 13, wherein an absolute value of a difference between the first threshold and the second threshold is smaller than ½-fold of a peak-to-peak value of the current sensing signal.

17. The power factor correction controller of claim 13, wherein the zero current prediction circuit includes:
   a first comparator and a second comparator;
   wherein the first comparator is configured to operably generate a first comparison signal according to a level of the current sensing signal and the first threshold;
   wherein the second comparator is configured to operably generate a second comparison signal according to the level of the current sensing signal and the second threshold;
   wherein the zero current prediction circuit is configured to operably generate the first period according to the first comparison signal and the second comparison signal.

18. The power factor correction controller of claim 17, wherein the zero current prediction circuit further includes:
   a timer circuit, which is configured to operably timing the first period between when the level of the current sensing signal passes the first period and when the level of the current sensing signal passes the second threshold according to the first comparison signal and the second comparison signal, so as to generate a timing signal, and the timer circuit is further configured to operably timing the second period according to the timing signal, wherein the second period has a period ratio to the first period.

19. The power factor correction controller of claim 18, wherein the timer circuit includes: at least one integration capacitor and at least one current source;
   wherein the zero current prediction circuit is configured to operably control the at least one switch by steps including:
   when the level of the current sensing signal passes the second threshold at a first time point, the at least one current source starts charging the at least one integration capacitor to perform a first integration from an initial potential;
   when the level of the current sensing signal passes the first threshold at a second time point, the at least one current source stopping executing the first integration on the at least one integration capacitor, wherein the at least one integration capacitor generates a first integration voltage at the second time point;
   starting from the second time point, the at least one current source starts charging the at least one integration capacitor to perform a second integration, wherein a time span between the first time point and the second time point is the first threshold; and
   during the second integration, determining a third time point according to a voltage of the at least one integration capacitor and the first integration voltage, wherein a time span between the second time point and the third time point is the second threshold, and wherein the third time point corresponds to the zero current time point.

20. The power factor correction controller of claim 19, wherein an absolute value of a difference between the first threshold and the second threshold is equal to an absolute value of a difference between the first threshold and the level of the current sensing signal at the third time point.

21. The power factor correction controller of claim 19, wherein the at least one integration capacitor includes: a first integration capacitor and a second integration capacitor, wherein the at least one current source includes: a first current source and a second current source, wherein the timer circuit further includes: a third comparator, which is configured to operably compare the first integration voltage with a voltage of the second integration capacitor, to generate a third comparison signal;
   wherein the zero current prediction circuit is configured to operably control the at least one switch by steps including:
   at the first time point, resetting a voltage of the first integration capacitor to the initial potential, and the first current source starting charging the first integration capacitor to perform the first integration from the initial potential;
   at the second time point, the first current source stopping executing the first integration on the first integration capacitor, so that the first integration capacitor generates the first integration voltage, and at the second time point, resetting a voltage of the second integration capacitor to the initial potential, and the second current source starting charging the second integration capacitor from the initial potential to perform the second integration; and
   during the second integration period, determining a time point at which the voltage of the second integration capacitor reaches the first integration voltage as the third time point;
   wherein the period ratio of the first period to the second period is related to a current source ratio of the first current source to the second current source and a capacitance ratio of a capacitance of the first integration capacitor to a capacitance of the second integration capacitor.

22. The power factor correction controller of claim 19, wherein the timer circuit further includes:
   a sample-and-hold circuit, which is configured to operably sample-and-hold the first integration voltage, to generate a sample-and-hold voltage; and
   a third comparator, which is configured to operably compare the sample-and-hold voltage with a voltage of the at least one integration capacitor, to generate a third comparison signal;
   wherein the zero current prediction circuit is configured to operably control the at least one switch by steps including:
   at the first time point, resetting a voltage of the at least one integration capacitor to the initial potential, and the at least one current source starting charging the at least one integration capacitor to perform the first integration from the initial potential;
   at the second time point, the at least one current source stopping executing the first integration on the at least one integration capacitor, so that the first integration capacitor generates the first integration voltage, and at the second time point, the sample-and-hold circuit sampling-and-holding the first integration voltage, to generate the sample-and-hold voltage; the voltage of the at least one integration capacitor being reset to the initial potential, and the at least one current source starting charging the at least one integration capacitor to perform the second integration from the initial potential;
   during the second integration, when the third comparison signal indicates a time point at which the voltage of the at least one integration capacitor reaches the sample-and-hold voltage, determining such time point indicated by the third comparison signal as the third time point.

23. The power factor correction controller of claim 19, wherein the at least one current source includes: a first current source and a second current source, wherein the timer circuit further includes: a third comparator, which is configured to operably compare a voltage of the at least one integration capacitor with a predetermined potential, to generate a third comparison signal;
   wherein the zero current prediction circuit is configured to operably control the at least one switch by steps including:
   at the first time point, resetting a voltage of the at least one integration capacitor to the initial potential, and the first current source starting charging the at least one integration capacitor to perform the first integration from the initial potential;
   at the second time point, the first current source stopping executing the first integration on the at least one integration capacitor, so that the first integration capacitor generates the first integration voltage; and resetting the voltage of the at least one integration capacitor to the initial potential, and the second current source starting charging the at least one integration capacitor to perform the second integration from the initial potential; and during the second integration, when the third comparison signal indicates a time point at which the voltage of the at least one integration capacitor reaches the predetermined potential, determining such time point indicated by the third comparison signal as the third time point;

wherein the period ratio of the first period to the second period is related to a current source ratio of the first current source to the second current source.

24. A control method of a power factor correction converter, comprising:

controlling at least one switch, so as to switch a coupling relationship between an inductor and a rectified power and a coupling relationship between the inductor and an output power, to thereby convert the rectified power to the output power, wherein the inductor is configured to operate in a boundary conduction mode (BCM) to correct a power factor of the rectified power;

sensing a current flowing through the inductor, so as to generate a current sensing signal;

generating a second period according to a first period, wherein the first period is a time period between when the current sensing signal passes a first threshold and when the current sensing signal passes a second threshold, and wherein a length of the second period is related to a length of the first period; and switching a state of the at least one switch at an end time point of the second period;

wherein the end time point of the second period corresponds to a zero current time point at which the current flowing through the inductor reaches zero.

25. The control method of claim 24, wherein the step of generating the second period includes:

when the level of the current sensing signal passes the second threshold at a first time point, starting timing the first period;

when the level of the current sensing signal passes the first threshold at a second time point, ending timing the first period; and starting from the second time point, generating and starting the second period according to the length of the first period.

26. The control method of claim 24, wherein a length of the first period is equal to a length of the second period.

27. The control method of claim 24, wherein an absolute value of a difference between the first threshold and the second threshold is smaller than a peak-to-peak value of the current sensing signal.

28. The control method of claim 24, wherein an absolute value of a difference between the first threshold and the second threshold is smaller than ½-fold of a peak-to-peak value of the current sensing signal.

* * * * *